(12) United States Patent
Asada et al.

(10) Patent No.: US 11,802,828 B2
(45) Date of Patent: Oct. 31, 2023

(54) CORROSION RESISTANCE TEST METHOD FOR COATED METAL MATERIAL AND WATER-CONTAINING MATERIAL FOR USE THEREIN

(71) Applicant: MAZDA MOTOR CORPORATION, Hiroshima (JP)

(72) Inventors: Teruaki Asada, Hiroshima (JP); Katsunobu Sasaki, Hiroshima (JP); Tatsuya Ezaki, Hiroshima (JP); Tsutomu Shigenaga, Hiroshima (JP); Akihide Takami, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 73 days.

(21) Appl. No.: 17/480,397

(22) Filed: Sep. 21, 2021

(65) Prior Publication Data
US 2022/0099557 A1  Mar. 31, 2022

(30) Foreign Application Priority Data
Sep. 29, 2020 (JP) .................. 2020-164069

(51) Int. Cl.
*G01N 17/02* (2006.01)
*G01N 17/00* (2006.01)

(52) U.S. Cl.
CPC ........... *G01N 17/02* (2013.01); *G01N 17/006* (2013.01)

(58) Field of Classification Search
CPC ..................................... G01N 17/02
USPC ................................................... 73/86
See application file for complete search history.

(56) References Cited

U.S. PATENT DOCUMENTS

2020/0182824 A1  6/2020  Asada et al.
2021/0325295 A1  10/2021  Asada et al.

FOREIGN PATENT DOCUMENTS

| CN | 107907474 A | * | 4/2018 | ........... G01N 17/006 |
|---|---|---|---|---|
| CN | 111307705 A | | 6/2020 | |
| EP | 3 686 575 A1 | | 7/2020 | |
| JP | 02122248 A | * | 5/1990 | |

(Continued)

OTHER PUBLICATIONS

Nishikawa et al. Translation of WO 2010016265 A1. Published Feb. 2010. Accessed Mar. 2023. (Year: 2010).*

(Continued)

*Primary Examiner* — Walter L Lindsay, Jr.
*Assistant Examiner* — Philip T Fadul
(74) *Attorney, Agent, or Firm* — Studebaker & Brackett PC

(57) ABSTRACT

A corrosion resistance test method for a coated metal material that includes a metal base and a surface treatment film, includes the steps of: disposing one or more water-containing material holders each holding a water-containing material to be in contact with the surface treatment film and one or more electrodes to be in contact with the water-containing material, and electrically connecting, with an external circuit, between the one electrode and the metal base, or between the electrodes; and supplying a current between the one electrode and the metal base, or between at least one of the electrodes and at least one of the other electrodes, as an anode and a cathode, to bring corrosion of the coated metal material to progress. The water-containing material has a viscosity at 65° C. of 10 mPa·s or more to 40 mPa·s or less.

20 Claims, 12 Drawing Sheets

(56) References Cited

FOREIGN PATENT DOCUMENTS

| JP | 2003-232766 A | 8/2003 | |
|---|---|---|---|
| JP | 2007-271501 A | 10/2007 | |
| JP | 2013-238583 A | 11/2013 | |
| JP | 2016-050915 A | 4/2016 | |
| JP | 2016-050916 A | 4/2016 | |
| JP | 2019-032171 A | 2/2019 | |
| JP | 6733844 B1 | 8/2020 | |
| WO | WO-2010016265 A1 * | 2/2010 | ............. G01N 17/02 |

OTHER PUBLICATIONS

Tang et al. Translation of CN 107907474 A. Published Apr. 2018. Accessed Mar. 2023. (Year: 2018).*
Haruyama et al. Translation of JP 02122248 A. Published May 1990. Accessed Mar. 2023. (Year: 1990).*

* cited by examiner

FIG.6
| ANODE SITE | CATHODE SITE | |
|---|---|---|
| APPEARANCE PHOTOGRAPH | APPEARANCE PHOTOGRAPH (BEFORE PEELING) | APPEARANCE PHOTOGRAPH (AFTER PEELING) |
| 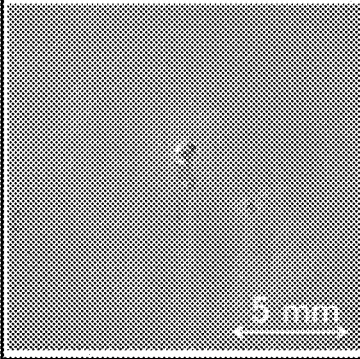 | 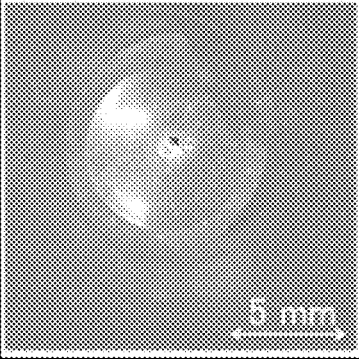 | 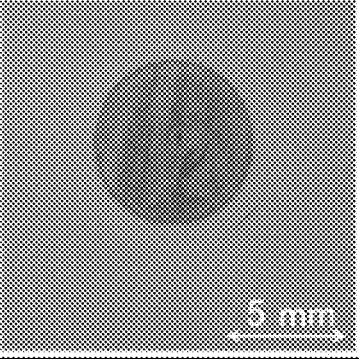 |

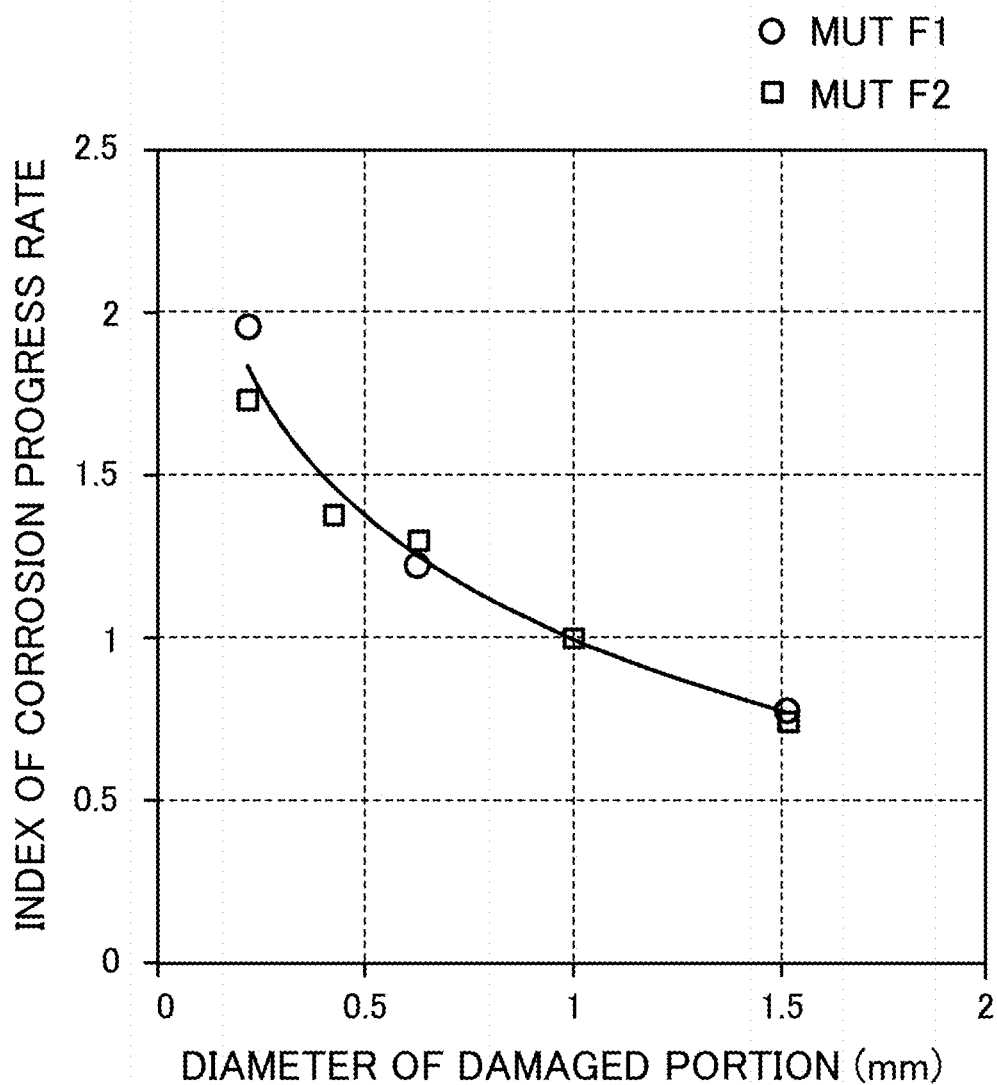

CORROSION RESISTANCE TEST METHOD FOR COATED METAL MATERIAL AND WATER-CONTAINING MATERIAL FOR USE THEREIN

CROSS-REFERENCE TO RELATED APPLICATION

This application claims priority to Japanese Patent Application No. 2020-164069 filed on Sep. 29, 2020, the entire disclosure of which is incorporated by reference herein.

BACKGROUND

The present disclosure relates to a corrosion resistance test method for a coated metal material and a water-containing material for use therein.

As a technique for evaluating the performance of coating films, the accelerated corrosion test such as a combined cycle test and a salt spray test has been performed.

The accelerated corrosion test requires several months for evaluation. It is thus difficult to simply evaluate, for example, the film quality of the coating film to be coated on steel sheets made of different components under different baking conditions and to rapidly optimize coating conditions. Thus, in the material development, the process control in coating factories, and the quality control relating to the rust prevention for vehicles, it is desired to establish a quantitative evaluation method for rapidly and simply evaluating the corrosion resistance of coated steel sheets.

In response to the desire, Japanese Unexamined Patent Publication No. 2007-271501 describes, as a technique for evaluating corrosion resistance of a coating applied to the surface of a metal member, a method in which a metal member having this coating and a counter electrode member are immersed in water or an electrolyte solution, the metal member is then electrically connected to a negative terminal side of a power supply for measurement, the counter electrode member is electrically connected to a positive terminal side of the power supply, and the anti-corrosive performance of the coating is evaluated on the basis of the oxygen diffusion-limited current flowing from the counter electrode member to the metal member through the coating.

Japanese Unexamined Patent Publication No. 2016-50915 indicates that an electrode is disposed near the surface of a coating film of a coated metal material via an electrolyte material, a voltage is applied between a base of the coated metal material and the surface of the coating film, and the corrosion resistance of the coated metal material is evaluated on the basis of the current value at the time when electrical breakdown of the coating film occurs.

Japanese Unexamined Patent Publication No. 2016-50916 indicates that an electrode is disposed near the surface of a coating film of a coated metal material via an electrolyte material, an electrolyte material is permeated into the coating film on the coated metal material, voltage is applied between a base of the coated metal material and the surface of the coating film, and the corrosion resistance of the coated metal material is evaluated based on the value of the current flowing with the application of the voltage.

Japanese Unexamined Patent Publication No. 2019-32171 discloses corrosion resistance test method and apparatus in which two artificially damaged portions apart from each other in the coated metal material are electrically connected to each other by the external circuit via an aqueous electrolyte material, and a current is supplied under the constant current control using one of the artificially damaged portions as an anode site and the other as a cathode site to progress corrosion.

SUMMARY

Although the corrosion resistance of the coated metal material can be evaluated by the corrosion resistance test methods described in Japanese Unexamined Patent Publication Nos. 2007-271501, 2016-50915, 2016-50916, and 2019-32171, it is required to establish a corrosion resistance test by which evaluation results with higher reliability can be obtained in a shorter time.

Hence, the present disclosure is intended to provide a corrosion resistance test method for a coated metal material, capable of obtaining highly reliable evaluation results in a shorter time, and a water-containing material for use in the same.

Solution to the Problems

In order to achieve the objective, a corrosion resistance test method for a coated metal material disclosed herein is directed to a corrosion resistance test method for a coated metal material that includes a metal base and a surface treatment film provided on the metal base. The method includes the steps of: disposing one or more water-containing material holders each holding a water-containing material to be in contact with the surface treatment film and one or more electrodes to be in contact with the water-containing material contained in the one water-containing material holder or in each of the water-containing material holders, and electrically connecting, with an external circuit, between the electrode and the metal base, or between the electrodes; and supplying a current between the one electrode and the metal base, or between at least one of the electrodes and at least one of the other electrodes, as an anode and a cathode, respectively from a current supplier provided on the external circuit to bring corrosion of the coated metal material to progress. The water-containing material has a viscosity at 65° C. of 10 mPa·s or more to 40 mPa·s or less.

In general, metal corrosion is known to progress through an anode reaction (oxidation reaction) of generating free electrons by melting (ionizing) metal that is in contact with water and a cathode reaction (reduction reaction) of generating a hydroxyl group $OH^-$ from dissolved oxygen in water by the free electrons occurred in parallel.

In this configuration, a current is supplied between the one electrode and the metal base, or between at least one of the electrodes and at least one of the other electrodes, as an anode and a cathode, respectively. For the current supply between the electrode serving as an anode and the metal base serving as a cathode, the cathode reaction progresses in a contact portion between the water-containing material and the metal base when the water-containing material permeating into the surface treatment film reaches the metal base. For at least one of the electrodes serving as an anode and at least one of the other electrodes serving as a cathode, the cathode reaction progresses in a contact portion between the metal base and the water-containing material near the electrode serving as an anode. In either case, electrolysis of water may also progress depending on the current supply conditions to generate hydrogen.

As the cathode reaction progresses, the area around the contact portion between the water-containing material and the metal base becomes an alkaline environment due to generation of $OH^-$. This damages the under-treated surface (chemically converted surface) of the metal base, thereby reducing adherence of the surface treatment film (simply reducing adherence between the metal base and the surface treatment film for no treatment performed on the surface of the metal base). Accordingly, the surface treatment film is lifted in the contact portion and expanded around the damaged portion. The surface treatment film with a reduced adherence to the metal base in the alkaline environment is further lifted by the hydrogen generated due to electrolysis of water and reduction of $H^+$. This causes progression of the expansion of the surface treatment film. Such progress of the cathode reaction and occurrence and progress of expansion of the surface treatment film are accelerated reproduction of actual corrosion of the coated metal material. That is, "bringing corrosion of the coated metal material to progress" herein refers to "causing expansion of the surface treatment film to occur and progress." Accordingly, for example, by checking the occurrence status of and the degree of the expansion of the surface treatment film occurred in the contact portion, the progress degree of the corrosion of the coated metal material can be determined.

The use of the water-containing material having a viscosity in the above-described range in such a corrosion resistance test increases the resistance force of the water-containing material acting on the surface treatment film during the test, as compared with the use of the commonly used salt water having a viscosity of less than 10 mPa·s. This makes it difficult for hydrogen generated in the contact portion between the water-containing material and the metal base to be released from, for example, a break of the surface treatment film, and makes the hydrogen be retained between the surface treatment film and the metal base. Then, the internal pressure between the surface treatment film and the metal base increases, which accelerates lifting of the surface treatment film. In addition, the water-containing material guided by the surface of the lifted surface treatment film near the metal base is efficiently supplied to a tip portion where expansion of the surface treatment film progresses. Further, the cathode reaction in the tip portion is accelerated, and a current efficiently flows via the tip portion. The acceleration of lifting of the surface treatment film by hydrogen and the acceleration of the cathode reaction in the tip portion further accelerate the progress of the expansion of the surface treatment film. Accordingly, corrosion of the coated metal material is effectively accelerated. This enables the corrosion resistance test for a coated metal material to be performed with higher reliability in a shorter time.

The viscosity of the water-containing material less than the lower limit may cause difficulty in obtaining sufficient acceleratory of the progress of the expansion of the surface treatment film. The viscosity of the water-containing material exceeding the upper limit may cause excessive suppression in releasing of hydrogen from a gap between the surface treatment film and the metal base. This may cause the gap between them to be large, thereby suppressing a sufficient contact between the water-containing material and the metal base. In this way, the progress of the cathode reaction may be suppressed, the current may not flow, and the expansion of the surface treatment film may not progress.

The water-containing material may have a viscosity at 65° C. of 20 mPa·s or more to 40 mPa·s or less.

This configuration enables further acceleration of progress of the expansion of the surface treatment film, and a corrosion resistance test for a coated metal material to be performed with higher reliability in a shorter time.

The water-containing material may comprise water, an electrolyte material, and a thickener.

The thickener may be a thickener of an urethane association type, preferably a polyether polyol-based urethane polymer.

The content of the thickener in the water-containing material may be 4.0 mass % or more to 15.5 mass % or less.

The water-containing material containing a thickener preferably with the content described above enables easy controlling of the viscosity of the water-containing material in the above-described range.

The method may further include the step of controlling a temperature of at least the coated metal material before the step to bring corrosion of the coated metal material to progress.

Controlling the temperature of the coated metal material makes it possible to efficiently accelerate the expansion of the surface treatment film of the coated metal material, and/or to simulate a corrosive environment more accurately.

The temperature of at least the coated metal material may be controlled to be lower than a glass transition temperature of the surface treatment film.

An increase in the temperature of the coated metal material to be equal to or higher than the glass transition temperature of the surface treatment film may change physical properties of the surface treatment film, and may lower the reliability of the corrosion resistance test. In the present configuration, the temperature of the coated metal material is controlled to be lower than the glass transition temperature of the surface treatment film. This can block the change in the physical properties of the surface treatment film, and allows a highly reliable corrosion resistance test to be performed. The glass transition temperature of the surface treatment film may be measured on a sample of the surface treatment film collected from the coated metal material by, e.g., thermomechanical analysis (TMA) or dynamic mechanical analysis (DMA), or by differential thermal analysis (DTA) or differential scanning calorimetry (DSC) in accordance with JIS K 7121.

The temperature of the coated metal material is suitably higher than the coagulation temperature of the water-containing material. The temperature of the coated metal material equal to or lower than the coagulation temperature of the water-containing material may cause a reduction in the temperature of the water-containing material in contact with the coated metal material to be equal to or less than the coagulation temperature, which may cause solidification of the water-containing material. Thus, the rate of the chemical reaction at the interface between the water-containing material and the surface treatment film greatly decreases, and it may be difficult to perform the corrosion resistance test.

The temperature of at least the coated metal material may be controlled to 30° C. or more to 100° C. or less.

According to the present configuration, the progress of the chemical reaction at the interface between the water-containing material and the surface treatment film can be accelerated to accelerate the corrosion of the coated metal material, while reducing the change in states of the water-containing material and the surface treatment film. This enables a reduction in the testing time of the corrosion resistance test.

If the coated metal material is for automobile parts and the surface treatment film is a coating film made from an automobile paint, the temperature of the coated metal material is suitably controlled to be less than about 90° C., preferably about 80° C. or less, because the coating film generally has a glass transition temperature of about 90° C. or more.

The coated metal material may have one or more damaged portions reaching the metal base through the surface treatment film, and the one or more water-containing material holders may be disposed so as for the water-containing material to be in contact with the one damaged portion or the damaged portions.

In general, a coated metal material with a surface treatment film starts to corrode after a corrosion factor such as salt water has permeated into the surface treatment film and reached the metal base. Specifically, the process of the corrosion of the coated metal material is divided into a stage until occurrence of the corrosion and a stage in which the corrosion progresses. The corrosion can be evaluated through determining the period until the corrosion starts (i.e., a corrosion resistance time) and the rate at which the corrosion progresses (corrosion progress rate).

For the coated metal material having a damaged portion reaching the metal base through the surface treatment film as in the present configuration, the water-containing material serving as a corrosion factor disposed in contact with the damaged portion enters the inside of the damaged portion, and reaches an exposing portion of the metal base. Upon the contact of the water-containing material with the exposing portion of the metal base, corrosion starts in the exposing portion. Then, the current supply causes occurrence and progress of expansion of the surface treatment film around the exposing portion where the cathode reaction is progressing. Specifically, the damaged portion provided in the coated metal material allows creation of the simulated state of the end of the corrosion resistance time out of the process of the corrosion of the coated metal material. In this way, the time from the start of current supply to the occurrence of expansion of the surface treatment film can be shortened.

In the step of supplying the current, progress of the corrosion of the coated metal material may be indicated by expansion of the surface treatment film generated around the one or more damaged portions. The method may further include the steps of: measuring a size of the one or more damaged portions before the step of supplying the current; measuring a size of the expansion of the surface treatment film after the step of supplying the current; and calculating a progress degree of the corrosion of the coated metal material, based on the size of the one or more damaged portions and the size of the expansion of the surface treatment film.

A variation in the size of the damaged portion where the cathode reaction progresses causes variations in the progress degree of electrolysis of water which progresses at the damaged portion, the degree of closure of the damaged portion due to expansion of the surface treatment film, the degree of degassing of hydrogen generated in the expanded surface treatment film, and the like. This further causes a variation in the size of the expansion of the surface treatment film, resulting in a reduction of the reliability of the corrosion resistance test. However, it is difficult to make the damaged portion have exactly the same size in order to reduce such variations.

In the present configuration, the size of the damaged portion before the current supply and the size of the expansion of the surface treatment film after the current supply are measured, and the progress degree of the corrosion of the coated metal material is calculated using these measurement results. This allows accurate evaluation of the progress degree of the corrosion of the coated metal material regardless of the size of the damaged portion where the cathode reaction progresses, measured before the current supply. Thus, the reliability and versatility of the corrosion resistance test can be improved.

The "size of the damaged portion" herein refers to the size of the damaged portion in a plan view, and is, for example, the diameter or area of the damaged portion. For a circular damaged portion in a plan view, the area of the damaged portion is given by the area of the circle. The diameter of the damaged portion is given by the maximum width of the damaged portion. The size of the damaged portion herein is assumed to be the same as the size of the exposing portion of the metal base at the damaged portion.

The "size of the expansion of the surface treatment film" herein refers to an expansion diameter or expansion area, or a peeling diameter or peeling area. The "expansion diameter" and the "expansion area" refer to the diameter and area of the expanded portion of the surface treatment film, respectively. The "peeling diameter" and the "peeling area" refer to the diameter and area of a peeled portion which is the exposing surface of the metal base exposed by peeling the expanded portion of the surface treatment film after the corrosion resistance test, respectively.

The method may further include the step of: correcting the calculated progress degree of the corrosion of the coated metal material, based on the size of the one or more damaged portions and a correlation between the size of the damaged portion and the progress degree of the corrosion of the coated metal material, the correlation being determined on an exploratory basis in advance.

In the present configuration, the calculated progress degree of the corrosion of the coated metal material is corrected based on the size of the one or more damaged portions before the current supply and a correlation between the size of the damaged portion and the progress degree of the corrosion of the coated metal material. This allows further accurate evaluation of the progress degree of the corrosion of the coated metal material regardless of the size of the damaged portion where the cathode reaction progresses, measured before the current supply. Thus, the reliability and versatility of the corrosion resistance test can be improved.

The correlation described above may be a correction factor corresponding to the size of the damaged portion.

The correction factor corresponding to the size of the damaged portion calculated in advance as the correlation makes the correction easy. Accordingly, the corrosion resistance test with high reliability and versatility can be performed with a simple configuration.

The progress degree of corrosion may be a rate of increase in the size of the expansion of the surface treatment film.

The rate of increase in the size of the expansion of the surface treatment film corresponds to the corrosion progress rate, out of the process of corrosion of the metal described above. Accordingly, the rate of increase in the size of expansion of the surface treatment film obtained as the progress degree of corrosion of the coated metal material enables accurate evaluation of the corrosion resistance related to the corrosion progress rate of the coated metal material.

The surface treatment film may be a resin coating film.

The coated metal material including a metal base and the resin coating film provided as a surface treatment film on the metal base facilitates progress of the expansion of the resin coating film between the metal base and the resin coating film, thereby improving the reliability of the corrosion resistance test.

The water-containing material disclosed herein is for use in the corrosion resistance test method for the coated metal material.

The use of the water-containing material having a viscosity in the above-described range in the corrosion resistance test increases the resistance force of the water-containing material acting on the surface treatment film during the test, as compared with the use of the commonly used salt water having a viscosity of less than 10 mPa·s. This makes it difficult for hydrogen generated in the contact portion between the water-containing material and the metal base to be released from, for example, a break of the surface treatment film, and makes the hydrogen be retained between the surface treatment film and the metal base. Then, the internal pressure between the surface treatment film and the metal base increases, which accelerates lifting of the surface treatment film, and in turn, further accelerates progress of the expansion of the surface treatment film. Accordingly, corrosion of the coated metal material is effectively accelerated. This enables the corrosion resistance test for a coated metal material to be performed with higher reliability in a shorter time.

The water-containing material may comprise water, an electrolyte material, and a thickener and may have a viscosity at 65° C. of 10 mPa·s or more to 40 mPa·s or less, preferably 20 mPa·s or more to 40 mPa·s controlled using the thickener.

The thickener may be a thickener of an urethane association type, preferably a polyether polyol-based urethane polymer.

The content of the thickener in the water-containing material may be 4.0 mass % or more to 15.5 mass % or less.

The water-containing material containing a thickener preferably with the content described above enables easy controlling of the viscosity of the water-containing material in the above-described range.

The water preferably includes ion-exchanged water, and the electrolyte material may include at least one selected from the group consisting of sodium chloride, potassium chloride, magnesium sulfate, potassium nitrate, calcium phosphate, and potassium hydrogen tartrate.

In this configuration, the material inexpensive and easily available is used as the electrolyte material. This enables sufficient electrical conductivity to be easily imparted to the water-containing material and a test to be conducted with higher reliability at lower costs. The use of the thickener which is easily available enables easy controlling of the viscosity.

A corrosion resistance test apparatus for use in the corrosion resistance test is, for example, directed to a corrosion resistance test apparatus for a coated metal material that includes a metal base and a surface treatment film provided on the metal base. The corrosion resistance test apparatus includes: one or more water-containing material holders disposed on the surface treatment film to hold a water-containing material that is in contact with the surface treatment film inside; one or more electrodes in contact with the water-containing material contained in the one or more water-containing material holder or in each of the water-containing material holders; an external circuit configured to electrically connect between the one electrode and the metal base, or between the electrodes; and a current supplier provided on the external circuit and configured to supply a current between the one electrode and the metal base, or between at least one of the electrodes and at least one of the other electrodes, as an anode and a cathode, respectively to bring corrosion of the coated metal material to progress.

The corrosion resistance test using such as corrosion resistance test apparatus and the water-containing material enables a corrosion resistance test for a coated metal material with higher reliability in a shorter time.

The corrosion resistance test apparatus may further include: a temperature control element that is brought into contact with the coated metal material and configured to control a temperature of at least the coated metal material; and a temperature controller connected to the temperature control element and configured to control a temperature of the temperature control element.

Controlling the temperature of the coated metal material with the temperature control element brought into contact with the coated metal material makes it possible to efficiently accelerate the expansion of the surface treatment film of the coated metal material, and/or to simulate a corrosive environment more accurately.

The temperature control element may include a first temperature control element disposed on the coated metal material across from the one or two water-containing material holders.

On the side of the coated metal material across from the water-containing material holder, i.e., on the back side of the coated metal material, no water-containing material holder is disposed. Thus, the first temperature control element can be easily disposed, and the temperature of the coated metal material can be easily controlled.

Specific examples of the first temperature control element include a hot plate, a Peltier element, and a flexible heater.

The first temperature control element may be disposed at a position at least corresponding to the one or two water-containing material holders.

In the present configuration, the first temperature control element is disposed at a position at least corresponding to the one or more water-containing material holders. This makes it possible to efficiently control the temperature of a portion of the coated metal material in contact with the water-containing material contained in the one or more water-containing material holders. This enables efficient temperature control of the coated metal material and the water-containing material in contact with the coated metal material, especially of the water-containing material in the vicinity of the interface between the surface treatment film and the water-containing material.

The temperature control element may include a second temperature control element disposed on the surface treatment film of the coated metal material.

According to the present configuration, even when the temperature control element cannot be disposed on the back side of the coated metal material due to restrictions such as the shape of the coated metal material, the second temperature control element disposed on the surface treatment film can control the temperature of the coated metal material and the water-containing material in contact with the coated metal material.

Specific examples of the second temperature control element include a flexible heater.

The second temperature control element may be disposed around the one or more water-containing material holders.

The temperature control element is provided to control the temperature of at least the coated metal material. However, the control of the temperature of the coated metal material may also control the temperature of the water-containing material in the water-containing material holder in contact with the surface treatment film. In particular, the temperature of the water-containing material near the interface between the surface treatment film and the water-containing material may be controlled. Thus, the progress of the chemical reaction at the interface between the water-containing material and the surface treatment film is accelerated, and the testing time of the corrosion resistance test is shortened. Therefore, the second temperature control element disposed on the surface treatment film is suitably disposed around the water-containing material holder. As a result, the temperature of the portion of the coated metal material in a region surrounded by the second temperature control element is effectively controlled, and in turn, the temperature of the water-containing material in contact with the surface treatment film can be accurately controlled.

The temperature control element may include a first temperature control element disposed on the coated metal material across from the one or more water-containing material holders, and a second temperature control element disposed on the surface treatment film of the coated metal material. The temperature controller may be connected to both of the first temperature control element and the second temperature control element to control temperatures of the first and second temperature control elements.

Providing both of the first and second temperature control elements as the temperature control element makes it possible to heat the coated metal material from the front and back sides, which facilitates the temperature control of the coated metal material. In addition, sharing the temperature controller between the first and second temperature control elements can contribute to reduction of influence of noise on the corrosion resistance test, improvement in the accuracy of control of the temperatures of the first and second temperature control elements, and the downsizing of the apparatus.

The temperature controller may be disposed on a side of the temperature control element.

If the temperature controller is disposed above or below the temperature control element, the water-containing material, if leaks from the water-containing material holder, may come into contact with and cause damage to the temperature controller. In the present configuration, the temperature controller is disposed on the side of the temperature control element. Thus, even if the water-containing material leaks from the water-containing material holder, contact between the temperature controller and the water-containing material can be blocked, and damage to the temperature controller can be reduced.

The coated metal material may have one or more damaged portions reaching the metal base through the surface treatment film. The one or more water-containing material holders may be disposed so as for the water-containing material to be in contact with the damaged portion. Progress of the corrosion of the coated metal material may be indicated by expansion of the surface treatment film generated around the damaged portion. The corrosion resistance test apparatus may further include: a first measurement device configured to measure a size of the one or more damaged portions; a second measurement device configured to measure a size of the expansion of the surface treatment film; and a calculator configured to calculate a progress degree of the corrosion of the coated metal material based on the size of the one or more damaged portions measured by the first measurement device and the size of the expansion of the surface treatment film measured by the second measurement device.

In the present configuration, the first and second measurement devices are used to measure the size of the one or more damaged portions before the current supply and the size of the expansion of the surface treatment film after the current supply, and the calculator is used to calculate, using these measurement results, the progress degree of the corrosion of the coated metal material. This allows accurate evaluation of the progress degree of the corrosion of the coated metal material regardless of the size of the damaged portion where the cathode reaction progresses, measured before the current supply. Thus, the reliability and versatility of the corrosion resistance test can be improved.

The first measurement device and/or the second measurement device may include an image detector for acquiring image data on the surface of the coated metal material, i.e., the surface of the surface treatment film, and a control device connected to the image detector. Examples of the image detector include a camera, a digital microscope, an optical microscope, and an electron microscope. The image data acquired with the image detector is transmitted to the control device. The control device may be configured to measure the size of the damaged portion and/or the size of the expansion of the surface treatment film on the image data.

This configuration uses the image data acquired with the image detector, and thus enables accurate measurements of the size of the damaged portion and/or the size of the expansion of the surface treatment film.

The corrosion resistance test apparatus may further include a corrector configured to correct the progress degree of the corrosion of the coated metal material calculated by the calculator, based on the size of the damaged portion and a correlation between the size of the damaged portion and the progress degree of the corrosion of the coated metal material, the correlation being determined on an exploratory basis in advance.

In the present configuration, the corrector is used to correct the progress degree of the corrosion of the coated metal material calculated by the calculator based on the size of the damaged portion before the current supply and a correlation between the size of the damaged portion and the progress degree of the corrosion of the coated metal material. The correlation is determined on an exploratory basis in advance. This allows accurate evaluation of the progress degree of the corrosion of the coated metal material regardless of the size of the damaged portion where the cathode reaction progresses, measured before the current supply. Thus, the reliability and versatility of the corrosion resistance test can be improved.

The use of the water-containing material having a viscosity in the above-described range in the corrosion resistance test according to the present disclosure increases the resistance force of the water-containing material acting on the surface treatment film during the test, as compared with the use of the commonly used salt water having a viscosity of less than 10 mPa·s. This makes it difficult for hydrogen generated in the contact portion between the water-containing material and the metal base to be released from, for example, a break of the surface treatment film, and makes the hydrogen be retained between the surface treatment film and the metal base. Then, the internal pressure between the surface treatment film and the metal base increases, which accelerates lifting of the surface treatment film. In addition, the water-containing material guided by the surface of the lifted surface treatment film near the metal base is efficiently supplied to a tip portion where expansion of the surface treatment film progresses. Further, the cathode reaction in the tip portion is accelerated, and a current efficiently flows via the tip portion. The acceleration of lifting of the surface treatment film by hydrogen and the acceleration of the cathode reaction in the tip portion further accelerate the progress of the expansion of the surface treatment film.

Accordingly, corrosion of the coated metal material is effectively accelerated. This enables the corrosion resistance test for a coated metal material to be performed with higher reliability in a shorter time.

BRIEF DESCRIPTION OF THE DRAWINGS

FIG. 6 shows digital photomicrographs of a portion around the damaged portion in the MUT A after the corrosion resistance test.

FIG. 13 is a graph showing a relationship between the diameter of a damaged portion and an index of the corrosion progress rate in a corrosion resistance test according to a third embodiment.

DETAILED DESCRIPTION

Embodiments of the present disclosure will now be described with reference to the drawings. The following description of the embodiments is merely an example in nature, and is not intended to limit the scope, applications, or use of the present disclosure.

First Embodiment

Figure 1:
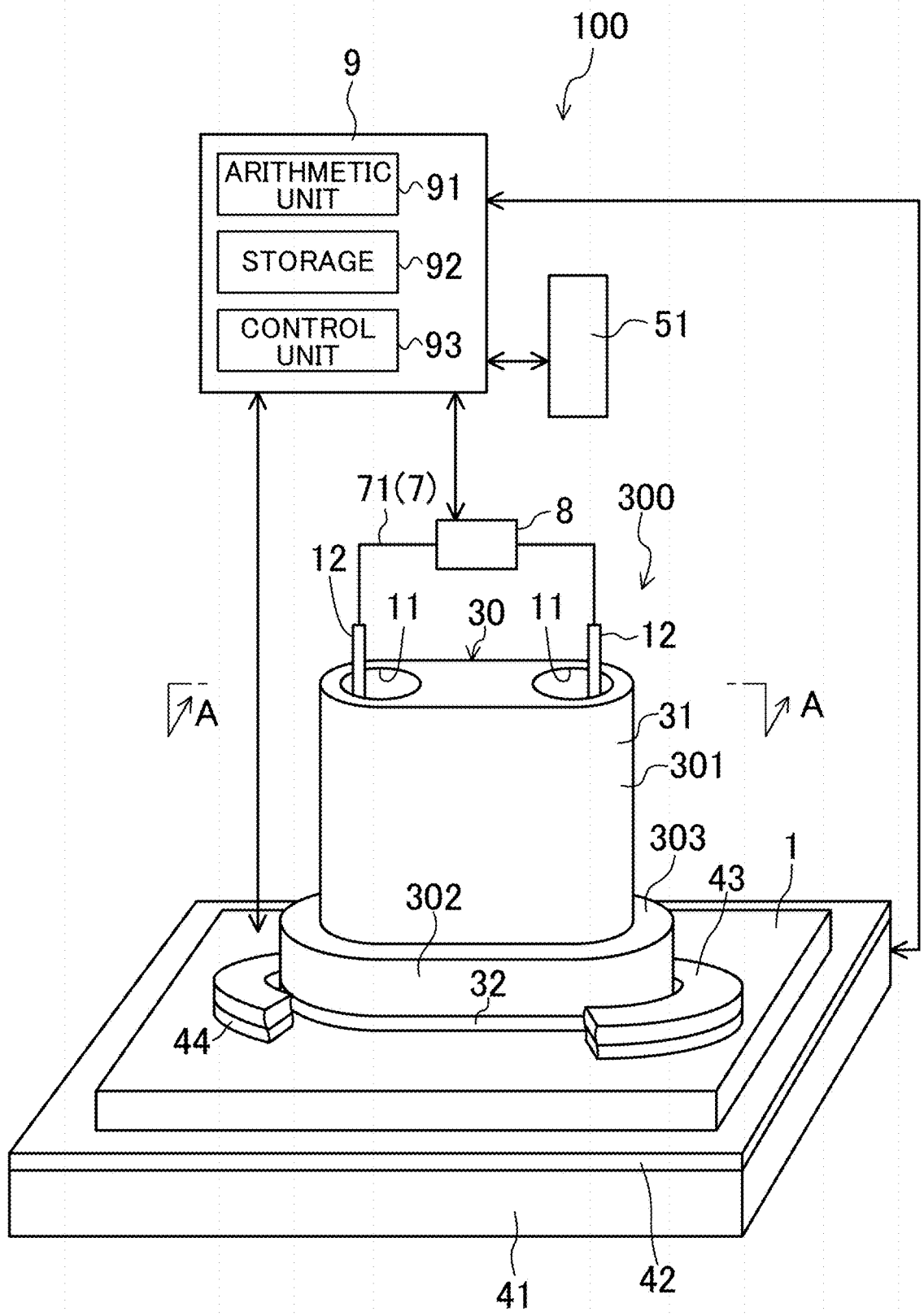
FIG. 1 illustrates an example corrosion resistance test apparatus according to a first embodiment.
Figure 2:
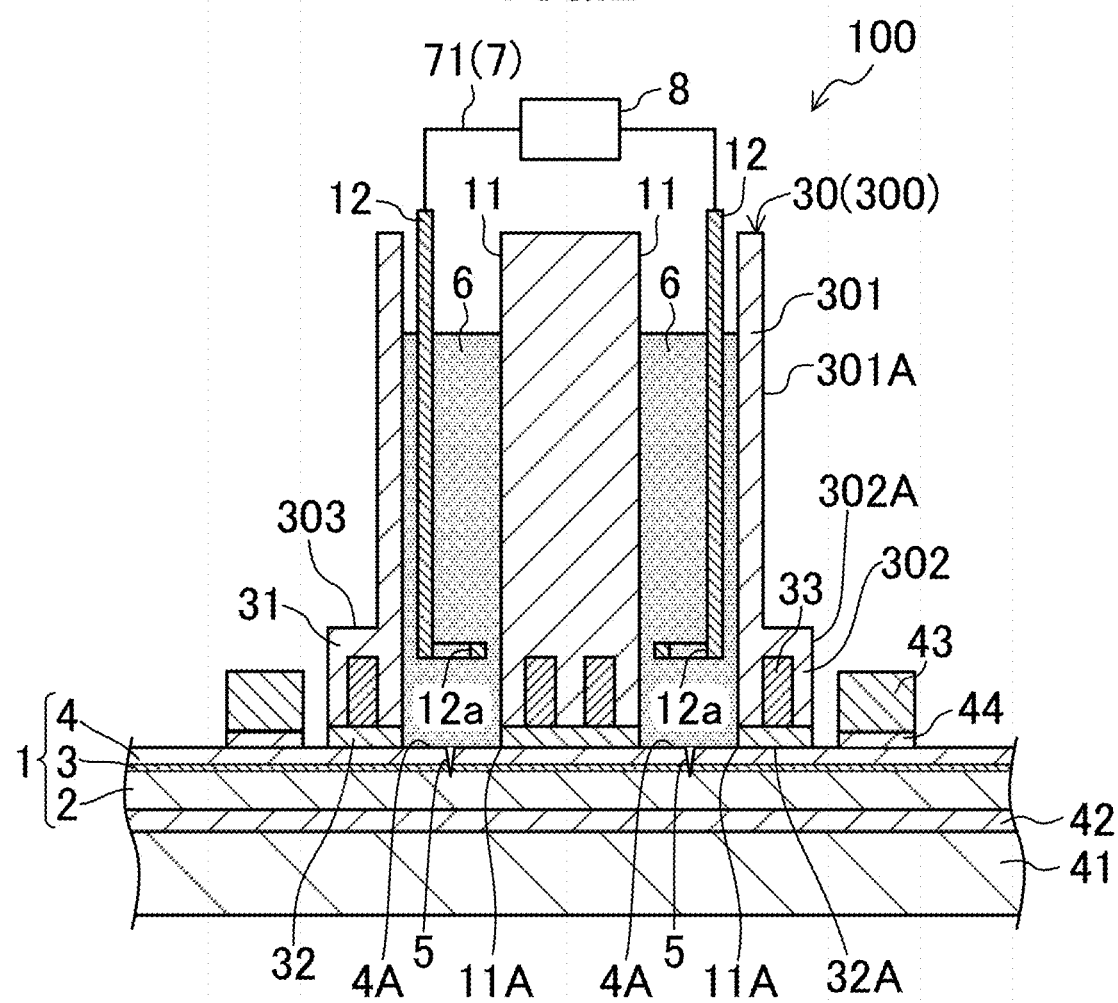
FIG. 2 is a cross-sectional view taken along line A-A shown in FIG. 1.
Figure 3:
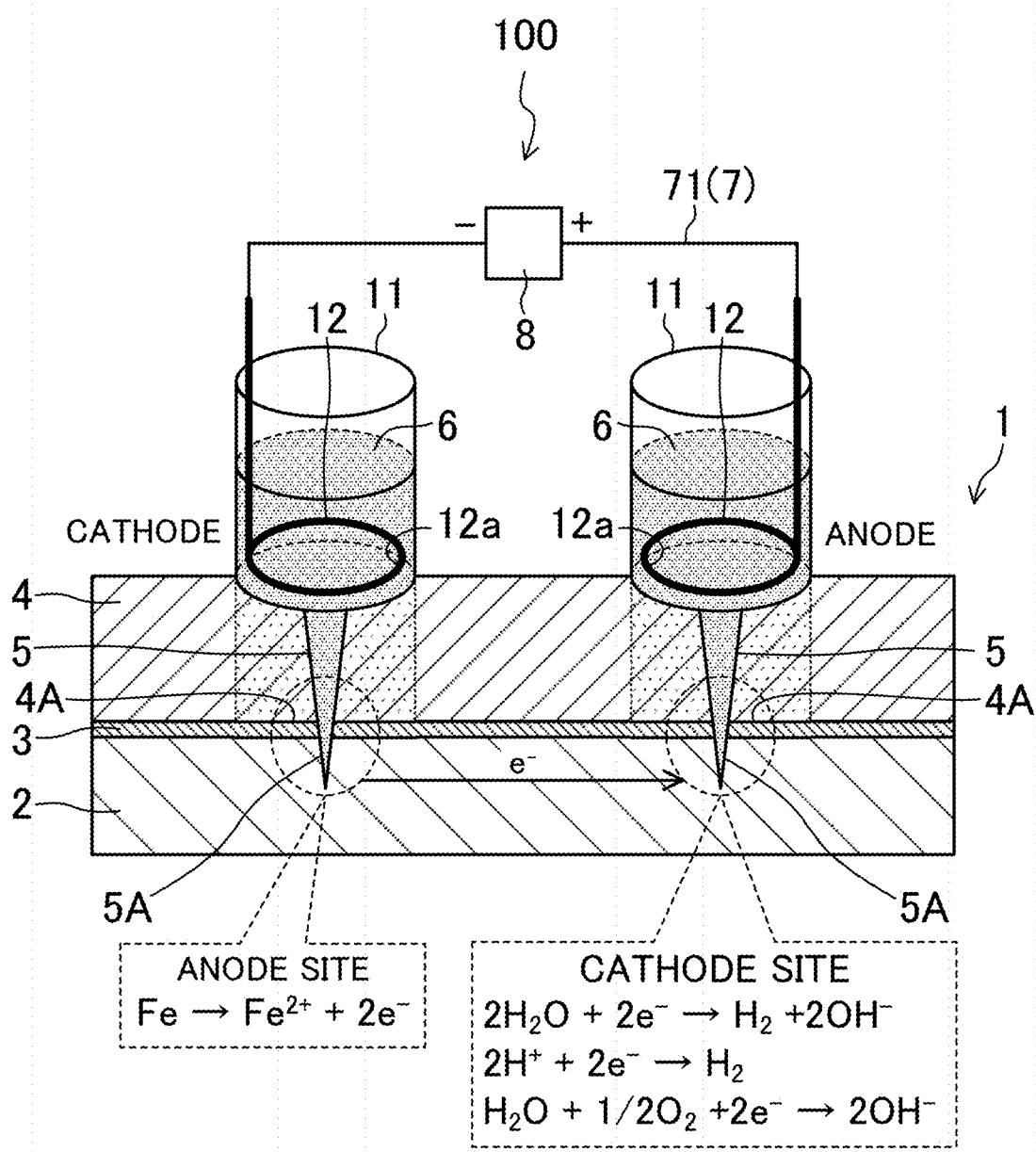
FIG. 3 illustrates the principle of a corrosion resistance test according to the first embodiment.
Figure 4:
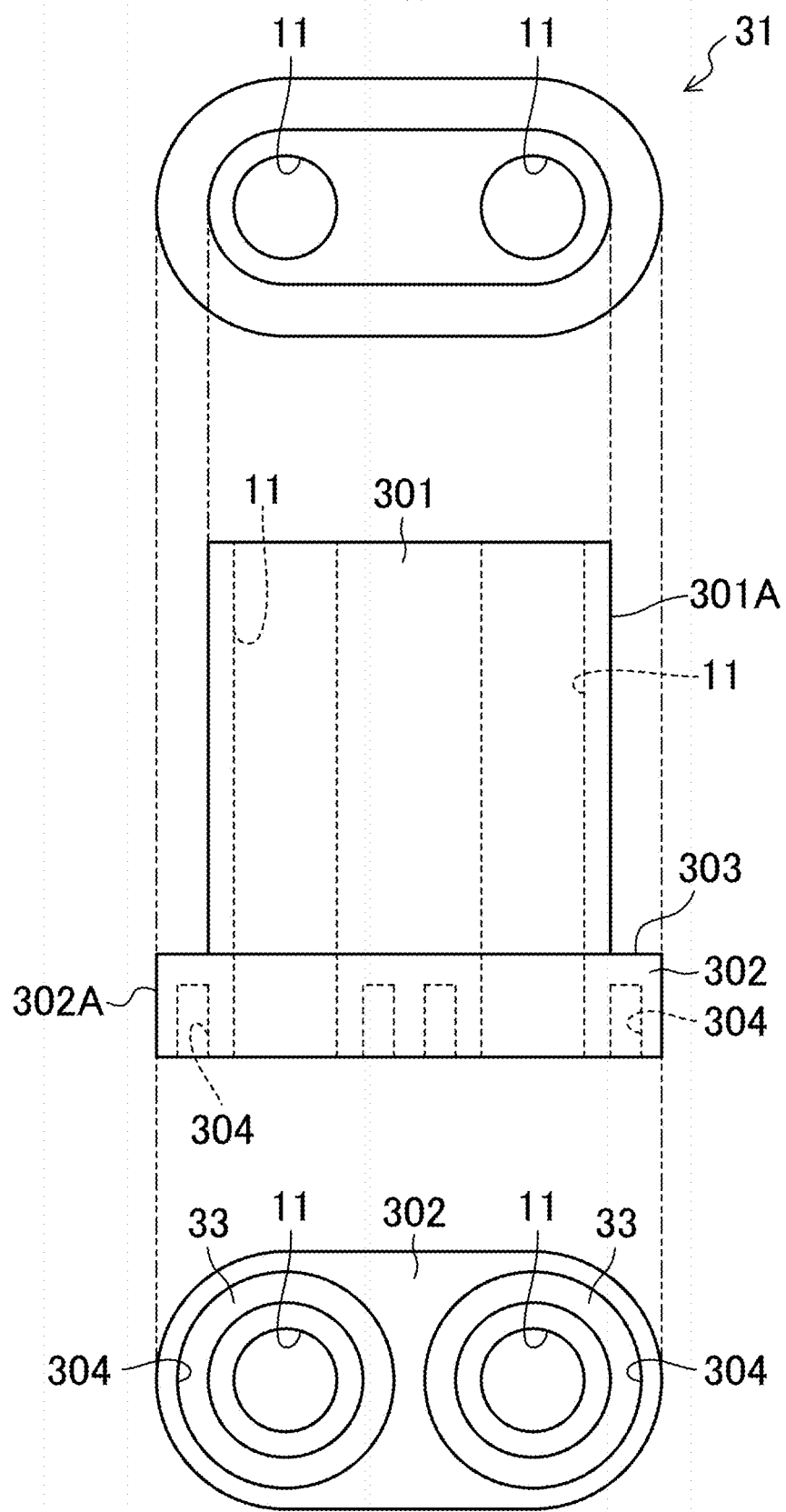
FIG. 4 illustrates a container body of the corrosion resistance test apparatus shown in FIG. 1.

FIGS. 1 and 2 show an example corrosion resistance test apparatus used in a corrosion resistance test for a coated metal material. FIG. 3 illustrates the principle of a corrosion resistance test method according to the present embodiment. In FIGS. 1 to 3, the reference numeral 1 represents the coated metal material, the reference numeral 300 represents an electrode portion device, and the reference numeral 100 represents the corrosion resistance test apparatus. FIG. 4 illustrates a container body 31 of the corrosion resistance test apparatus 100 shown in FIG. 1.

<Coated Metal Material>

Examples of the coated metal material targeted for the corrosion resistance test according to the present embodiment include a coated metal material including a metal base and a resin coating film provided as a surface treatment film on the metal base.

The metal base may be, for example, a steel material for forming an electric household appliance, a building material, or an automobile part, such as a cold-rolled steel plate (SPC), a galvanized alloy steel sheet (GA), a high-tensile strength steel sheet, or a hot stamping material, or may be a light alloy material. The metal base may include, on its surface, a chemical conversion coating (e.g., a phosphate coating, such as a zinc phosphate coating, or a chromate coating).

Specific examples of the resin coating film include cationic electrodeposition coating films (undercoat films) based on an epoxy resin, an acrylic resin, and the like.

The coated metal material may include a multilayer film of two or more layers, as the surface treatment film. Specifically, for example, for the surface treatment film being a resin coating film, the coated metal material may be a multilayered coating film obtained by overlaying a topcoat film on an electrodeposition coating film or by overlaying an intermediate coating film and a topcoat film on an electrodeposition coating film.

The intermediate coating film serves to secure reliable finishing and chipping resistance of the coated metal material and to improve adherence between the electrodeposition coating film and the topcoat film. The topcoat film secures reliable color, finishing, and weather resistance of the coated metal material. Specifically, these coating films may be made from, for example, a paint containing: a base resin, such as a polyester resin, an acrylic resin, and an alkyd resin; and a crosslinking agent, such as a melamine resin, a urea resin, and a polyisocyanate compound (including a blocked polyisocyanate compound).

The corrosion resistance test of the present embodiment is targeted for the coated metal material described above, and allows, for example, taking out of parts from the manufacturing line in each coating step and check of the qualities of the coating films, in a manufacturing process of an automobile member.

A coated metal material 1 including: a metal base that includes a steel sheet 2 and a chemical conversion coating 3 on the steel sheet 2; and an electrodeposition coating film 4 (resin coating film) provided as a surface treatment film on the metal base will be described below as an example.

As illustrated in FIGS. 2 and 3, damaged portions 5 are formed in the coated metal material 1 at two positions apart from each other to reach the steel sheet 2 through the electrodeposition coating film 4 and the chemical conversion coating 3. The two damaged portions 5 are included in respective measurement target portions 4A where a water-containing material 6 is disposed. The damaged portions 5 may be artificially made or naturally made. The damaged portions 5 may be formed at three or more positions apart from each other. In this case, the two damaged portions 5 mean two out of the three or more damaged portions 5.

<Water-Containing Material>

The water-containing material 6 for use in the corrosion resistance test method according to the present embodiment contains water and an electrolyte material, and functions as a conductive material.

Water can be, although not particularly limited thereto, tap water, distilled water, or ion-exchanged water, for example. In order to ensure stability during current supply and improve reliability of the test, ion-exchanged water is desirably used as water because of containing less impurities.

The electrolyte material is a salt and is for imparting sufficient electrical conductivity to the water-containing material 6. Specific examples of the electrolyte material include sodium chloride, potassium chloride, magnesium sulfate, potassium nitrate, calcium phosphate, potassium hydrogen tartrate, sodium sulfate, and calcium chloride. The electrolyte material is preferably at least one selected from the group consisting of sodium chloride, potassium chloride, magnesium sulfate, potassium nitrate, calcium phosphate, and potassium hydrogen tartrate, particularly preferably at least one selected from the group consisting of sodium chloride, sodium sulfate, and calcium chloride. The use of the material inexpensive and easily available such as those described above as the electrolyte material enables sufficient electrical conductivity to be easily imparted to the water-containing material 6 and a test to be conducted with higher reliability at lower costs. The water-containing material 6 contains the electrolyte material preferably at 1 mass % or more to 20 mass % or less, more preferably at 3 mass % or more to 15 mass % or less, particularly preferably at 5 mass % or more to 10 mass % or less.

The water-containing material 6 may be a muddy material further containing a clay mineral. For the water-containing material 6 further containing a clay mineral, ions and water in the water-containing material 6 easily permeate through a portion of the electrodeposition coating film 4 around the damaged portions 5 in a temperature control step S4 and a current supply step S5, which will be described later. The clay mineral is for making the water-containing material 6 into muddy material and promoting the movement of ions and permeation of water into the electrodeposition coating film 4 to accelerate progress of corrosion in the current supply step S5. The clay mineral may be, for example, a layered silicate mineral or zeolite. The layered silicate mineral may be, for example, at least one selected from kaolinite, montmorillonite, sericite, illite, glauconite, chlorite, and talc. Out of these, kaolinite may be particularly preferably employed. The water-containing material 6 may contain a clay mineral preferably at 1 mass % or more to 70 mass % or less, more preferably at 10 mass % or more to 50 mass % or less, particularly preferably at 20 mass % or more to 30 mass % or less. The water-containing material 6 being a muddy material can be provided even on a non-horizontal surface of the electrodeposition coating film 4.

The water-containing material 6 may contain an additive in addition to water, the electrolyte material, and the clay mineral. Specific examples of the additive include organic solvents such as acetone, ethanol, toluene, and methanol, and substances for improving wettability of the coating film. These organic solvents, substances, and the like can also function to promote permeation of water into the electrodeposition coating film 4. Any of these organic solvents, substances, and the like may be added to the water-containing material 6 as a substitute for the clay mineral. For the water-containing material 6 containing an organic solvent, a substance, or the like, the content thereof is preferably 5% or more to 60% or less, more preferably 10% or more to 40% or less, particularly preferably 20% or more to 30% or less, relative to the content of water in terms of volume ratio.

The viscosity of the water-containing material 6 at 65° C. is 10 mPa·s or more to 40 mPa·s or less, preferably 20 mPa·s or more to 40 mPa·s or less. The viscosity of the water-containing material of less than 10 mPa·s may cause difficulty in obtaining sufficient acceleratory of the progress of the expansion of the electrodeposition coating film 4. The viscosity of the water-containing material 6 exceeding 40 mPa·s may cause excessive reduction in releasing of hydrogen from a gap between the electrodeposition coating film 4 and the steel sheet 2. This may cause the gap between them to be large, thereby suppressing a sufficient contact between the water-containing material 6 and the steel sheet 2. In this way, the progress of the cathode reaction may be suppressed, the current may not flow, and the expansion of the electrodeposition coating film 4 may not progress.

The viscosity of the water-containing material 6 may be adjusted by the contents of the clay mineral, the additive, and the like, or by, for example, adding a thickener to the water-containing material 6. Particularly for the water-containing material 6 which does not contain a clay mineral, an additive, and the like, the viscosity is adjusted desirably by adding a thickener. The thickener is not particularly limited, but specific examples thereof include nonionic, water-soluble thickeners. The nonionic, water-soluble thickeners are preferably urethane association type thickeners, particularly preferably polyether polyol-based urethane polymers, in order to easily adjust the viscosity and be easily available. The thickener can be a commercial product. The polyether polyol-based urethane polymers can be ADEKA NOL UH-526, UH-530, UH-541VF, UH-438, UH-450VF (all manufactured by ADEKA CORPORATION), and SN-Thickener 612, 619, 612NC, 621N, 621TF, 623N, and 625N (all manufactured by SAN NOPCO LIMITED). These thickeners may be used alone or in combination of two or more of them. For the water-containing material 6 being a mixture of water, an electrolyte material, and a thickener, the content of the thickener in the water-containing material 6 is preferably 4.0 mass % or more to 15.5 mass % or less, more preferably 5.0 mass % or more to 15.0 mass % or less, in order to adjust the viscosity of the water-containing material 6 at 65° C. to be in the above-described range. The content of the thickener being less than the lower limit may cause an insufficient viscosity of the water-containing material 6. The content of the thickener exceeding the upper limit may cause a too large viscosity.

<Corrosion Resistance Test Apparatus>

The corrosion resistance test apparatus 100 includes an electrode portion device 300, an external circuit 7, a current supplier 8 (a current detector), a control device 9 (a temperature controller, a first measurement device, a second measurement device, a calculator, a corrector), a hot plate 41 (a first temperature control element), a flexible heater 43 (a second temperature control element), and a camera 51 (a first measurement device, a second measurement device, an image detector).

<<Electrode Portion Device>>

The electrode portion device 300 is for use in a corrosion resistance test according to the present embodiment, and includes a container 30 and electrodes 12.

—Container—

The container 30 is placed on the electrodeposition coating film 4 of the coated metal material 1. The container 30 includes a container body 31 and an optional bottom portion 32.

Specifically as shown in FIGS. 1 and 4, the container 30 is a member that is elliptical in a plan view, and includes the container body 31 and the bottom portion 32. The container 30 is a cylindrical member having two through holes 11, which penetrate the container body 31 and the bottom portion 32 in a direction substantially perpendicular to a bottom surface 32A.

The two through holes 11 each have an opening 11A formed through the bottom surface 32A. When the container 30 is placed on the electrodeposition coating film 4 with the bottom surface 32A making contact with the electrodeposition coating film 4, regions of the electrodeposition coating film 4 defined by the openings 11A serve as two measurement target portions 4A. The through holes 11 and the measurement target portions 4A constitute water-containing material holders in each of which the water-containing material 6 is contained. Each of the water-containing material holders including the through hole 11 and the measurement target portion 4A herein may be collectively referred to as the "water-containing material holder 11." The water-containing material 6 comes into contact with the surface of the measurement target portion 4A of the electrodeposition coating film 4.

[Container Body and Bottom Portion]

The bottom portion 32 is in contact with the surface of the electrodeposition coating film 4 via the bottom surface 32A. The container body 31 is disposed opposite to the bottom surface 32A in the bottom portion 32.

The water-containing material 6 is in contact with the surface of the electrodeposition coating film 4 and enters the damaged portions 5, with the water-containing material 6 contained in each of the water-containing material holders 11.

The bottom portion 32 is a sheet-like sealing material made from a silicone resin, for example, and is used to improve adherence between the container body 31 and the electrodeposition coating film 4, and fill the gap therebetween, when the container 30 is placed on the coated metal material 1. This can effectively reduce leaking of the water-containing material 6 from the gap between the container body 31 and the electrodeposition coating film 4. The bottom portion 32 is preferably provided in order to sufficiently reduce leaking of the water-containing material 6, although it may not be provided.

The container body 31 may be made from a resin material, such as an acrylic resin, an epoxy resin, and aromatic polyether ether ketone (PEEK) or from ceramic, particularly preferably made from a resin material, such as an acrylic resin, an epoxy resin, and an aromatic polyether ether ketone (PEEK). This allows a reduction in the weight and cost of the electrode portion device 300, and in turn, of the corrosion resistance test apparatus 100, while securing insulation between the container body 31 and the outside.

As illustrated in FIGS. 1, 2, and 4, the container body 31 has a base portion 302 near the bottom portion 32, and an extension portion 301 extended from the base portion 302 in a direction away from the bottom portion 32. The base portion 302 has a larger diameter than the extension portion 301 in a plan view. An outer circumferential surface 302A of the base portion 302 and an outer circumferential surface 301A of the extension portion 301 are in connection with each other via a step portion 303.

The inner diameters of the container body 31 and bottom portion 32 in each of the through holes 11, i.e., the diameters of the water-containing material holders 11, are suitably larger than the diameters of the damaged portions 5. The container 30 is suitably placed on the electrodeposition coating film 4 such that each of the water-containing material holders 11 is concentric with the corresponding damaged portion 5. The container 30 having the foregoing configuration can contain a sufficient amount of the water-containing material 6 required for the corrosion resistance test while the water-containing material 6 covers the entire damaged portion 5. For example, for the damaged portion 5 having a diameter of 0.1 mm or more to 7 mm or less, the diameter of the water-containing material holder 11 may be, for example, 0.5 mm or more to 45 mm or less, preferably 0.5 mm or more to 30 mm or less. The container 30 having this configuration can contain a sufficient amount of the water-containing material 6 required for the corrosion resistance test while the water-containing material 6 covers the entire damaged portion 5.

Portion of the base portion 302 in the vicinity of the bottom portion 32 have grooves 304. Each of the grooves 304 is positioned around an associated one of the openings 11A, and contains a ring-shaped magnet 33 therein. That is, a single ring-shaped magnet 33 is disposed around each of the openings 11A. Thus, the container 30 is attracted and fixed to the coated metal material 1 by the attractive force of the magnets 33 while the container 30 is placed on the electrodeposition coating film 4 of the coated metal material 1. This can effectively reduce the displacement of the container 30, and can improve the reliability of the corrosion resistance test to be described below.

The magnet 33 may be, for example, a ferrite magnet, a neodymium magnet, a samarium-cobalt magnet, but is suitably a neodymium magnet or a samarium-cobalt magnet, in order to obtain a high attractive force.

The magnet 33 is suitably sealed with, for example, an epoxy resin after being placed in the groove 304. This can reduce removal of the magnet 33 from the groove 304, and leaking of the water-containing material 6 through the water-containing material holder 11 into the groove 304, for example. In addition, the sealing secures insulation between the magnet 33 and the water-containing material 6. This substantially prevents a reduction in the reliability of the corrosion resistance test due to dissolution of highly conductive components of the magnet 33 into the water-containing material 6.

—Electrode—

Two electrodes 12 are provided with their distal ends 12a being sunk in, and thus are in contact with, the water-containing material 6. Specifically, the two electrodes 12 are in contact with the respective water-containing materials 6 contained in the respective water-containing material holders 11.

Specific examples of the electrodes 12 include a carbon electrode and a platinum electrode.

The electrode 12 may be in a shape commonly used in electrochemical measurement, but is preferably a perforated electrode having at least one hole at its distal end 12a. The distal end 12a is preferably disposed such that the hole is substantially parallel to the surface of the electrodeposition coating film 4. For example, a perforated electrode has a ring-shaped distal end 12a, and is provided such that the ring faces the electrodeposition coating film 4. Alternatively, a mesh electrode may be employed as the perforated electrode. The mesh electrode may be disposed to be substantially parallel with the electrodeposition coating film 4 with being sunk in the water-containing material 6.

The current supply step S5, which will be described later, may cause hydrogen to be generated at each of the damaged portions 5. The hydrogen is removed through the hole provided in the distal end 12a, thereby avoiding retention of the hydrogen between the electrode 12 and the electrodeposition coating film 4. In this way, it is possible to avoid deterioration of the electrical conductivity.

<<External Circuit>>

The external circuit 7 includes a wiring 71 and a current supplier 8 disposed on the wiring 71. The two electrodes 12 are connected to the respective ends of the wiring 71. Specifically, the wiring 71 electrically connects the two electrodes 12. The wiring 71 may be of any known type.

—Current Supplier—

The current supplier 8 serves as a power supply that supplies a voltage/current between the two electrodes 12 in the current supply step S5 which will be described later. The current supplier 8 also serves as a current detector/voltage detector that detects a current/voltage flowing between them. Specific examples of the current supplier 8 include a potentiostat/galvanostat that can control an applied voltage/current.

The current supplier 8 is electrically or wirelessly connected to the control device 9 to be described later, and is controlled by the control device 9. Current supply information such as a voltage value, a current value, time for current supply, and other parameters applied from the current supplier 8 to the external circuit 7 or detected by the current supplier 8 are transmitted to the control device 9.

<<Hot Plate and Flexible Heater>>

The hot plate 41 and the flexible heater 43 (may be hereinafter collectively referred to as "temperature control elements 41, 43") are for controlling temperature of at least the coated metal material 1. The control of the temperature herein includes warming, cooling, and maintaining at a predetermined temperature.

The hot plate 41 is disposed on the coated metal material 1 across from the container 30, that is, on the back side (on the steel sheet 2) of the coated metal material 1. The hot plate 41 is for adjusting the temperatures of the coated metal material 1 and portion of the water-containing material 6 near the electrodeposition coating film 4 from the back side of the coated metal material 1. The first temperature control element may be, for example, a Peltier element or a flexible heater as a substitute for the hot plate 41.

The hot plate 41 has a first insulating portion 42 (insulating portion) disposed at a portion making contact with the coated metal material 1. In other words, the hot plate 41 is in contact with the coated metal material 1 via the first insulating portion 42. When the temperature of the coated metal material 1, particularly the temperature of the steel sheet 2, is adjusted in accordance with the temperature control using the hot plate 41, the temperatures of the chemical conversion coating 3 and the electrodeposition coating film 4 are also adjusted. Then, the temperature of the water-containing material 6 in the water-containing material holders 11 in contact with the electrodeposition coating film 4, particularly the water-containing material 6 near the interface between the electrodeposition coating film 4 and the water-containing material 6, is adjusted.

The flexible heater 43 is in contact with the front side of the coated metal material 1, that is, the electrodeposition coating film 4, and is disposed around the water-containing material holders 11. Specifically, the flexible heater 43 is disposed on the electrodeposition coating film 4 so as to surround the entire outer circumferential surface 302A of the base portion 302 of the container 30. In FIG. 1, the flexible heater 43 is partially cut off in order to clearly show the base portion 302 and bottom portion 32 of the container body 31.

The flexible heater 43 has a second insulating portion 44 (insulating portion) disposed at a portion coming into contact with the coated metal material 1. In other words, the flexible heater 43 is in contact with the coated metal material 1 via the second insulating portion 44. The temperature of the coated metal material 1, particularly a portion surrounded by and inside of the flexible heater 43, is adjusted in accordance with the temperature control of the flexible heater 43. Then, the temperature of the water-containing material 6 in the water-containing material holder 11 in contact with the portion that has its temperature adjusted, particularly the water-containing material 6 near the above-described interface, is adjusted. The flexible heater 43 is preferably disposed over the entire circumference of the container 30, but may be disposed only partially. Specific examples of the flexible heater 43 include an aluminum foil heater, a film heater, and a rubber heater. A heater covered with a metal material, such as an aluminum foil heater, may be disposed together with the second insulating portion 44. The film heater or the rubber heater has a metal heating element covered with an insulating material such as a resin film or silicone rubber. It thus may be considered that the second insulating portion 44 is integral with the flexible heater 43. Even when the film heater or the rubber heater is used, the second insulating portion 44 may be disposed separately.

When controlling the temperature of the coated metal material 1, the temperature control elements 41, 43 suitably control the temperature of the water-containing material 6 in contact with the electrodeposition coating film 4, particularly the water-containing material 6 near the interface between the electrodeposition coating film 4 and the water-containing material 6. Thus, the progress of the chemical reaction at the interface between the electrodeposition coating film 4 and the water-containing material 6 is accelerated, and the testing time of the corrosion resistance test is shortened. The hot plate 41 is suitably disposed at least at a position corresponding to the water-containing material holder 11 on the back side of the coated metal material 1 in order to accurately and efficiently control the temperatures of the coated metal material 1 and the water-containing material 6. Likewise, the flexible heater 43 is suitably disposed around the container 30, preferably over the entire circumference thereof as described above, in order to accurately and efficiently control the temperatures of the coated metal material 1 and the water-containing material 6.

In the corrosion resistance test to be described later, the control of the temperatures of the coated metal material 1 and the water-containing material 6 using the temperature control elements 41, 43 can accelerate movement of ions to and permeation of water into the electrodeposition coating film 4, and can cause corrosion of the damaged portions 5 to effectively progress. This allows the corrosion resistance test to be performed in a shorter time with higher reliability. Further, the temperatures of the coated metal material 1 and the water-containing material 6 can be kept constant over desired testing time. This allows the corrosion resistance test to be performed under a predetermined temperature condition with higher reliability.

The first insulating portion 42 and the second insulating portion 44 (may be hereinafter collectively referred to as "insulating portions 42, 44") are provided to secure insulation between the temperature control elements 41, 43 and the coated metal material 1.

The coated metal material 1 is easily damaged, and may have a damaged portion that naturally reaches a base material, i.e., the steel sheet 2, during handling. When the exposing portion of the steel sheet 2 comes into direct contact with the contact portion of each of the temperature control elements 41, 43, a leakage current flows through the contact portion, which lowers the reliability of the corrosion resistance test.

Specifically, the coated metal material 1 of the present embodiment has no surface treatment film such as the electrodeposition coating film 4 on the back side, and the steel sheet 2 is exposed. In such a case, even when an oxide film or any other film is present on the surface of the steel sheet 2, a damaged portion is naturally formed to expose the metal of the steel sheet 2. If the temperature control element 41, 43 has no insulating portion 42, 44, the exposing portion of the metal directly comes into contact with the contact portions of the temperature control elements 41, 43.

If the surface treatment film such as the electrodeposition coating film 4 is formed on the back side of the coated metal material 1, and if a plating material is used as the metal base, the coated metal material 1 is easily damaged, and a damaged portion that naturally reaches the base material, i.e., the steel sheet 2, during handling may be formed. Particularly when a damaged portion is artificially formed in the front side of the coated metal material 1, the back side of the steel sheet 2 may slightly expand due to the pressure at the time of forming the damaged portion. Then, the surface treatment film or the plating is peeled off the expanded portion, and the metal of the steel sheet 2 is exposed.

Thus, when the exposing portion of the metal and the temperature control elements 41, 43 come into direct contact with each other, a leakage current flows through the contact portion. The corrosion resistance test causes an electrochemical reaction accompanied by movement of electrons to progress. The reliability of the corrosion resistance test is thus lowered if the leakage current flows.

In this configuration, the temperature control elements 41, 43 are brought into contact with the coated metal material 1 via the insulating portions 42, 44. This can secure insulation between the coated metal material 1 and the temperature control elements 41, 43, and can block the leakage current from flowing via the contact portions. This allows the corrosion resistance test for the coated metal material to be performed with higher reliability.

The shapes and the like of the insulating portions 42, 44 are not particularly limited. Specifically, for example, each of the insulating portions 42, 44 may be a member such as a dish-shaped or tray-shaped container, a sheet, or a film which is disposed to present between the corresponding temperature control element 41, 43 and the coated metal material 1, and at least an outer side of which is insulative. If the insulating portions 42, 44 are such member, separate members may be prepared, and the temperature control elements 41, 43 may be disposed on the coated metal material 1 via the members. In the corrosion resistance test, the water-containing material 6 may leak from the gap between the container 30 and the electrodeposition coating film 4 to cause contamination, and in turn, failure, of peripheral devices such as the temperature control elements 41, 43 and the control device 9. Thus, in order to reduce the contamination and failure of the peripheral devices due to the leakage of the water-containing material 6, a dish-shaped or tray-shaped container may be employed as the insulating portion 42, 44.

Each of the insulating portions 42, 44 may be a layer made from an insulating material disposed on a surface of the corresponding temperature control element 41, 43 to be in contact with the coated metal material 1. According to this configuration, the insulating portions 42, 44 is in the form of a layer. Thus, the insulating material can be disposed on the entire surfaces of the temperature control elements 41, 43, which can more reliably secure the insulation between the coated metal material 1 and the insulating portions 42, 44. Specifically, the layer made from the insulating material is obtained by coating the surfaces of the temperature control elements 41, 43 with the insulating material by a method such as application, printing, vapor deposition, or lamination.

Specific examples of the insulating material constituting the insulating portions 42, 44 include heat resistant insulating resins, e.g., polyester such as polyethylene terephthalate and polyethylene-2,6-naphthalate, polyolefin such as polyethylene and polypropylene, polyvinyl such as polyvinyl chloride and polyvinylidene chloride, polyamide, aromatic polyamide, and polyphenylene sulfide. Other specific examples include insulating resins having higher thermal conductivity, such as low-hardness acrylic resins and silicone resins with high thermal conductivity. Other specific examples include ceramics such as SiC, AlN, BN, BeO, $Al_2O_3$, $Si_3N_4$, mica, and isinglass, and mixtures obtained by mixing powders of such ceramics with a resin such as an epoxy resin, an acrylic resin, and a silicone resin. The insulating material may be one of these materials or a combination of two or more of these materials.

When each of the insulating portions 42, 44 is a member such as the above-described container, sheet, or film, at least the outer side of the member needs to be covered with the insulating material. Specifically, the insulating portion 42, 44 may be an insulating resin container, or may be a metal container having a surface covered with an insulating resin film or the like in order to improve the thermal conductivity.

The insulating portions 42, 44 may have flexibility. The term "flexibility" refers to a property of becoming deformed when stressed and returning to an original shape when the stress is removed. The insulating portions 42, 44 having flexibility can absorb warpage, unevenness, and the like of the coated metal material 1, and can secure a sufficient contact between the coated metal material 1 and the temperature control elements 41, 43. This improves the accuracy of controlling the temperature of the coated metal material 1 by the temperature control elements 41, 43, thereby improving the reliability of the corrosion resistance test. Examples of the insulating material having flexibility include the above-described silicone resin with high thermal conductivity.

The insulating portions 42, 44 preferably have a thickness of 1 μm or more to 5 mm or less, more preferably 3 μm or more to 1 mm or less, particularly preferably 5 μm or more to 500 μm or less. If the thickness is less than 1 μm, it may become difficult to secure the insulation between the coated metal material 1 and the temperature control elements 41, 43. If the thickness is 5 mm or more, it is difficult to secure sufficient thermal conductivity of the insulating portions 42, 44, which may lower the accuracy of control of the temperature of the coated metal material 1 by the temperature control elements 41, 43. Setting the thickness of the insulating portions 42, 44 within the above range makes it possible to maintain sufficient thermal conductivity of the insulating portions 42, 44 while securing insulation between the coated metal material 1 and the temperature control elements 41, 43.

The temperature control elements 41, 43 are electrically or wirelessly connected to the control device 9 to be described later. A control unit 93 of the control device 9 serves as the temperature controller to control the temperatures of the temperature control elements. As described above, the temperature control elements 41, 43 are suitably controlled by a single temperature controller. In other words, the temperature controller connected to the hot plate 41 suitably also serves as the temperature controller connected to the flexible heater 43. While electrochemical measurements are susceptible to noise, the temperature controller can be a source of noise. In particular, when the corrosion resistance test apparatus 100 is moved to perform a corrosion resistance test in a factory or outdoors, it may be difficult to block the noise. Even in such an environment, with the control device 9 also serving as the temperature controller for the temperature control elements 41, 43, the number of sources of noise can be reduced, and the influence of noise on the corrosion resistance test can be reduced. The control device 9 also serves as the temperature controller for the temperature control elements 41, 43. The temperatures of the temperature control elements 41, 43 thus can be controlled with improved accuracy without having any difference between temperature controllers. Further, the wiring line can be made less complicated, thereby contributing to the simplification and downsizing of the corrosion resistance test apparatus 100. This configuration is not intended to limit the use of devices other than the control device 9 as a temperature controller. The temperatures of the temperature control elements 41, 43 may be controlled by different temperature controllers.

The corrosion resistance test apparatus may be provided with both of the temperature control elements 41, 43, or either one of them. Having both of the temperature control elements 41, 43, the corrosion resistance test apparatus is able to heat the coated metal material 1 from both of the front and back sides, which facilitates the temperature control of the coated metal material 1. Providing either one of the temperature control elements 41, 43 can reduce power consumption. For either one of the temperature control elements 41, 43 provided, the corrosion resistance test apparatus preferably has the hot plate 41 in order to accurately control the temperature of the water-containing material 6 near the interface between the electrodeposition coating film 4 and the water-containing material 6. For example, if the coated metal material 1 is a part having a closed cross section, it may be difficult to dispose the hot plate 41 on the back side of the coated metal material 1 due to restrictions such as the shape of the coated metal material 1. In such a case, the flexible heater 43 is suitably disposed on the front side of the coated metal material 1 to control the temperatures of the coated metal material 1 and the water-containing material 6.

Even for both the temperature control elements 41, 43 provided, both of or either one of the temperatures of the water-containing material 6 and the coated metal material 1 may be adjusted.

<<Camera>>

The camera 51 is a device for taking an image of the surface of the coated metal material 1, and includes, for example, a CCD camera. The camera 51 is electrically or wirelessly connected to the control device 9. An image taken with the camera 51, i.e., image data, is transmitted to the control device 9. The camera 51 takes an image of the damaged portion 5 before the current supply step S5 in the first measurement step S2 to be described later, and takes an image of the expansion of the electrodeposition coating film 4 around the damaged portion 5 after the current supply step S5 in the second measurement step S6 to be described later.

<<Control Device>>

The control device 9 is based on, for example, a known microcomputer, and includes an arithmetic unit 91, a storage 92, and a control unit 93. The control device 9 may further include a display unit such as a display, and an input unit such as a keyboard, although not shown. The storage 92 stores pieces of information such as various pieces of data and arithmetic processing programs. The arithmetic unit 91 performs various kinds of arithmetic processing based on the information stored in the storage 92, information input with the input unit, and other information. The control unit 93 outputs a control signal to the target to be controlled to perform various kinds of controls based on the data stored in the storage 92, an arithmetic result of the arithmetic unit 91, and the like.

As mentioned above, the control device 9 is electrically or wirelessly connected to the current supplier 8, the hot plate 41, the flexible heater 43, and the camera 51.

In FIG. 1, the control device 9 is illustrated above the coated metal material 1, but is not limited to such a configuration. If the control device 9 is disposed above or below the temperature control elements 41, 43, the water-containing material 6, if leaks from the water-containing material holder 11, may come into contact with and cause damage to the control device 9. Thus, for example, the control device 9 may be disposed on the side of the temperature control elements 41, 43. This can block contact between the control device 9 and the water-containing material 6 even if the water-containing material 6 leaks from the water-containing material holder 11, and can reduce damage to the control device 9.

As mentioned above, the current supply information detected with the current supplier 8, the temperature information detected with the temperature sensor 37, and the image data taken with the camera 51 are transmitted to the control device 9 and is stored in the storage 92. The control unit 93 outputs a control signal to the current supplier 8, the hot plate 41, and the flexible heater 43 to control a voltage value/current value applied from the current supplier 8 to the external circuit 7 and the temperature settings of the hot plate 41 and the flexible heater 43. Note that the control device 9 may also be configured to output a control signal to the camera 51, for example, to control the timing of taking an image with the camera 51.

In the first measurement step S2 described later, the arithmetic unit 91 serves as the first measurement device to measure the size of the damaged portion 5 based on the image data of the surface of the coated metal material 1 stored in the storage 92. In the second measurement step S6 described later, the arithmetic unit 91 serves as the second measurement device to measure the size of the expansion of the electrodeposition coating film 4 around the damaged portion 5 based on the image data.

The arithmetic unit 91 also functions as a calculator that calculates the progress degree of corrosion of the coated metal material 1 in the calculation step S7 to be described later. The storage 92 further stores information on the calculated progress degree of the corrosion of the coated metal material 1.

<Corrosion Resistance Test Method>

Figure 5:
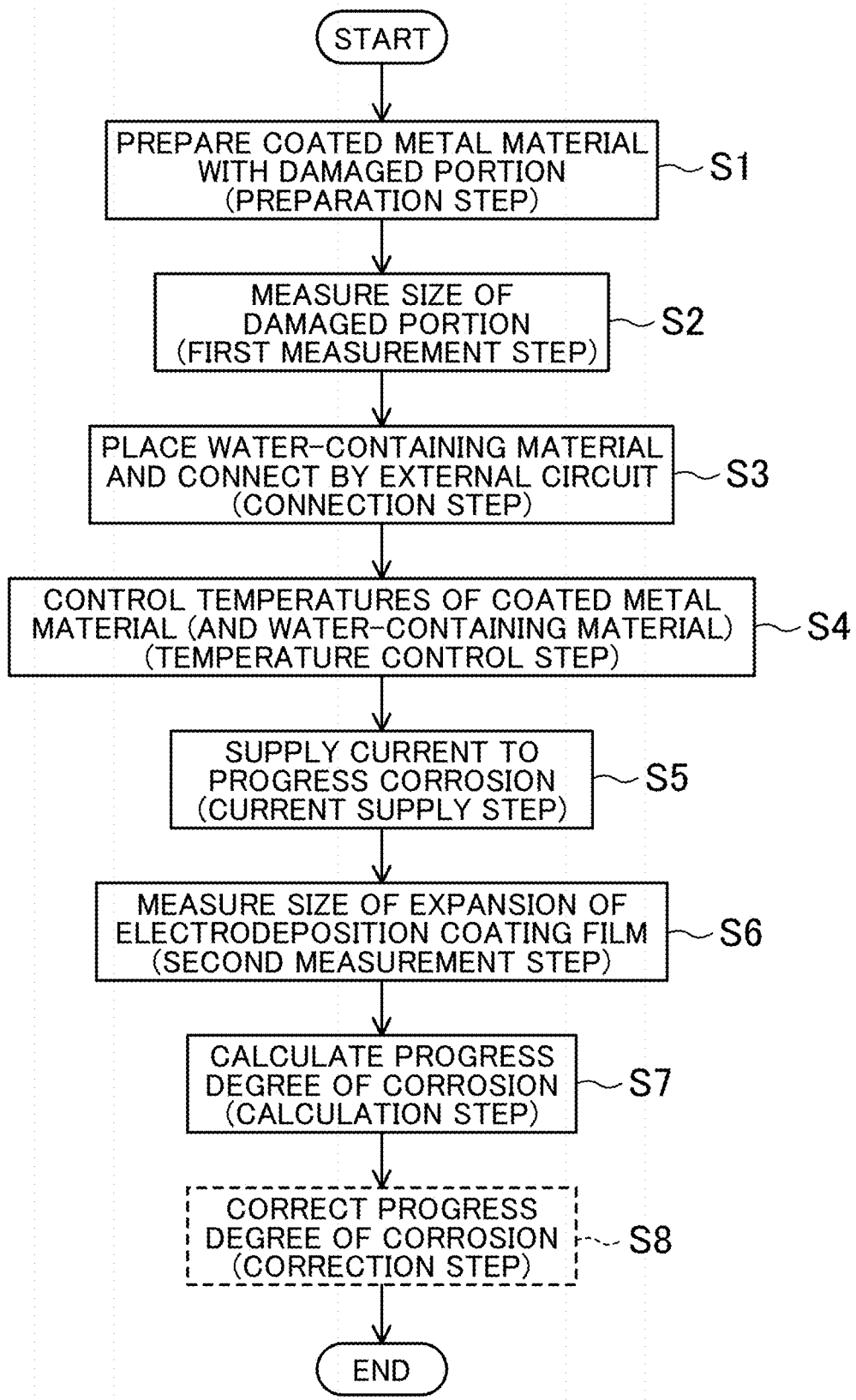
FIG. 5 is a flowchart of a corrosion resistance test method according to the first embodiment.

FIG. 5 illustrates a flowchart of a corrosion resistance test method according to the present embodiment.

The corrosion resistance test method according to the present embodiment includes, as shown in FIG. 5, a preparation step S1, a first measurement step S2, a connection step S3, a temperature control step S4, a current supply step S5, a second measurement step S6, a calculation step S7, and an optional correction step S8. These steps will now be described. The correction step S8 will be described in the third embodiment.

<<Preparation Step>>

In the preparation step S1, prepared is a coated metal material 1 having damaged portions 5 formed at least two positions apart from each other to reach a steel sheet 2 through an electrodeposition coating film 4 and a chemical conversion coating 3.

As mentioned above, the process of the corrosion of the coated metal material is divided into a stage until occurrence of the corrosion and a stage in which the corrosion progresses. The corrosion can be evaluated through determining the period until the corrosion starts (i.e., a corrosion resistance time) and the rate at which the corrosion progresses (corrosion progress rate).

If there is a damaged portion 5 reaching the steel sheet 2 through the electrodeposition coating film 4 and the chemical conversion coating 3, the water-containing material 6, when comes into contact with the damaged portion 5, enters the damaged portion 5, and comes into contact with the exposed portion of the steel sheet 2. The damaged portion 5 allows creation of the simulated state at the end of the stage until occurrence of the corrosion, that is, at the end of the corrosion resistance time, out of the process of the corrosion of the coated metal material 1. This allows information on the corrosion progress rate to be efficiently obtained in the corrosion resistance test.

As mentioned above, the damaged portion 5 may be a naturally damaged portion or an artificially damaged portion, and suitably an artificially damaged portion. The artificially damaged portion 5 is allowed to be formed in a desired shape and size to some extent, for example. Thus, it becomes easy to measure the size of the damaged portion 5 in the first measurement step S2. Further, the progress of the expansion of the electrodeposition coating film 4 in the current supply step S5 is facilitated. It also becomes easy to measure the size of the expansion of the electrodeposition coating film 4 in the second measurement step S6. Accordingly, the quantitativeness and reliability of the corrosion resistance test can be improved.

The damaged portion 5 may be a dot-shaped damaged portion, a linear damaged portion such as a cut made with a cutter, but is preferably a dot-shaped damaged portion. At least one of the two damaged portions 5 is suitably in a dot shape. The damaged portion 5 in the dot shape in this preparation step S1 is preferably the damaged portion 5 with a larger size of expansion of the electrodeposition coating film 4 measured in the second measurement step S6 to be described later. Further, the damaged portion 5 in the dot shape is preferably the damaged portion 5 at which the cathode reaction progresses in the current supply step S5 to be described later, i.e., the damaged portion 5 serving as a cathode site. In this case, the shape of the damaged portion 5 serving as an anode site is not particularly limited, and may be, for example, a linear shape such as a cut made with a cutter. The "dot shape" herein means a shape such as a circular, a polygonal, or the like in a plan view, with a ratio between the maximum width and the minimum width of 2 or less. The dot-shaped damaged portion 5 allows the electrodeposition coating film 4 to be expanded effectively in a dome shape in response to the corrosion, thereby allowing the corrosion acceleratory to be improved.

The artificially damaged portion 5 may be formed with any kind of tool. The dot-shaped damaged portion 5 is formed preferably with an artificially damaging punch or an indenter of a Vickers hardness tester at a predetermined load in order not to vary the size and depth of the dot-shaped damaged portions 5, i.e., in order to form the dot-shaped damaged portion 5 quantitatively. For example, the linear damaged portion 5 other than the dot-shaped damaged portion 5 may be formed with a cutter or another tool.

The distance between the two damaged portions 5 is preferably 2 cm or more, more preferably 3 cm or more in order to easily check the expansion of the electrodeposition coating film 4.

<<First Measurement Step>>

The first measurement step S2 is a step of measuring the size of the damaged portion 5.

Specifically, an image of the periphery of the damaged portion 5 on the surface of the electrodeposition coating film 4 is taken with the camera 51. The arithmetic unit 91 measures the size, i.e., the diameter, area, and the like, of the damaged portion 5 on the obtained image data.

The measurement may be performed on the two damaged portions 5 or only one of the damaged portions 5 which is to be the cathode site in the current supply step S5.

When the damaged portion 5 is in the dot shape, the diameter of the damaged portion 5, particularly the diameter of the damaged portion 5 serving as the cathode site, is preferably 0.1 mm or more to 7 mm or less, more preferably 0.2 mm or more to 5 mm or less, particularly preferably 0.3 mm or more to 1.5 mm or less. Regardless of the shape of the damaged portion 5, the area of the damaged portion 5 is preferably 0.01 $mm^2$ or more to 40 $mm^2$ or less, more preferably 0.02 $mm^2$ or more to 20 $mm^2$ or less, particularly preferably 0.05 $mm^2$ or more to 2 $mm^2$ or less.

As will be described later, in the above preferable range, the smaller the diameter or the area, the more the corrosion is accelerated. However, when the diameter is reduced to less than 0.1 mm (and/or the area is reduced to less than 0.01 $mm^2$), the electrical conductivity is lowered and the cathode reaction is difficult to proceed. On the other hand, the diameter exceeding 7 mm (and/or the area exceeding 40 $mm^2$) causes the cathode reaction to be unstable, and causes the progress of the expansion of the electrodeposition coating film 4 described later to slow down. The size of the damaged portion 5 within the above range accelerates the progress of the cathode reaction and the progress of the expansion of the electrodeposition coating film 4.

<<Connection Step>>

Specifically, the connection step S3 is a step of electrically connecting the two electrodes 12 in contact with the respective water-containing materials 6 contained in the two water-containing material holders 11 with the external circuit 7.

Specifically, for example, first, the first insulating portion 42 is disposed on the heater surface of the hot plate 41 as shown in FIGS. 1 and 2. Then, the coated metal material 1 is placed on the first insulating portion 42 with the electrodeposition coating film 4 facing upward. Thus, the hot plate 41 is brought into contact with the coated metal material via the first insulating portion 42. Then, the container 30 is disposed on the electrodeposition coating film 4 of the coated metal material 1 so as for the water-containing material holders 11 to respectively surround the two damaged portions 5. At this time, the container 30 is suitably disposed such that each of the water-containing material holders 11 is concentric with the corresponding damaged portion 5. Further, the flexible heater 43 is disposed on the electrodeposition coating film 4 around the entire circumference of the container 30 via the second insulating portion 44.

Then, a resistance value between each of the temperature control elements 41, 43 and the steel sheet 2 is measured using a resistance meter to confirm that insulation between the temperature control elements 41, 43 and the steel sheet 2 is secured. A commercially available tester can be used as the resistance meter. Herein, when the resistance value is preferably greater than 20 MΩ, more preferably equal to or greater than 100 MΩ, particularly preferably equal to or greater than 1GΩ, it is determined that the insulation between the temperature control elements 41, 43 and the steel sheet 2 is secured.

For example, one of the two terminals of the resistance meter may be fixed to the heater portion of the temperature control element 41, 43. Thus, the resistance value between the temperature control element 41, 43 and the steel sheet 2 can be measured only by bringing the other terminal of the resistance meter into contact with the steel sheet 2. This can simplify the process of measuring the resistance value.

Then, the water-containing materials 6 are placed at a predetermined amount in the water-containing material holders 11. Next, the two ring-shaped electrodes 12 provided at both ends of the external circuit 7 are placed in the respective water-containing material holders 11 to be sunk in the water-containing material 6. At this time, each of the electrodes 12 is preferably disposed such that the ring-shaped distal end 12a of the electrode 12 is parallel to the surface of the electrodeposition coating film 4 and is concentric with the damaged portion 5.

Thus, the water-containing material 6 contained in each of the water-containing material holders 11 comes into contact with the surface of the electrodeposition coating film 4, and enters the inside of the damaged portion 5. The two electrodes 12 in contact with the water-containing materials 6 are electrically connected with the external circuit 7.

<<Temperature Control Step>>

The temperature control step S4 is a step of controlling, with the temperature control elements 41, 43, the temperature of at least the coated metal material 1, preferably the temperatures of the coated metal material 1 and the water-containing materials 6, more preferably the temperature of the coated metal material 1 and the temperature of the water-containing material 6 near the interface between the electrodeposition coating film 4 and the water-containing material 6.

The temperatures of the coated metal material 1 and other targets are suitably controlled by the temperature control elements 41, 43 to be lower than the glass transition temperature of the electrodeposition coating film 4. When the temperature of the coated metal material 1 rises to be equal to or higher than the glass transition temperature of the electrodeposition coating film 4, physical properties of the electrodeposition coating film 4 may change, and the reliability of the corrosion resistance test may be lowered. In this configuration, the temperature of the coated metal material 1 is controlled to be lower than the glass transition temperature of the electrodeposition coating film 4. This can block the change of the physical properties of the electrodeposition coating film 4, and allows a corrosion resistance test to be performed with higher reliability. The glass transition temperature of the electrodeposition coating film 4 may be measured on a sample of the surface treatment film collected from the coated metal material 1 by, e.g., thermomechanical analysis (TMA) or dynamic mechanical analysis (DMA), or by differential thermal analysis (DTA) or differential scanning calorimetry (DSC) in accordance with JIS K 7121.

The temperature of the coated metal material 1 is suitably higher than the coagulation temperature of the water-containing material 6. The temperature of the coated metal material 1 equal to or lower than the coagulation temperature of the water-containing material 6 may cause a reduction in the temperature of the water-containing material 6 in contact with the coated metal material 1 to be equal to or less than the coagulation temperature, which may cause solidification of the water-containing material 6. Thus, the rate of the chemical reaction at the interface between the water-containing material 6 and the electrodeposition coating film 4 greatly decreases, and it may be difficult to perform the corrosion resistance test.

Specifically, the temperature of the coated metal material 1 and other targets is preferably controlled to 30° C. or more, more preferably 40° C. or more, particularly preferably 50° C. or more, and preferably 100° C. or less, more preferably 90° C. or less, particularly preferably 80° C. or less. According to the present configuration, the progress of the chemical reaction at the interface between the water-containing material 6 and the electrodeposition coating film 4 can be accelerated to accelerate the corrosion of the coated metal material 1, while reducing the change in states of the water-containing material 6 and the electrodeposition coating film 4. This enables a reduction in the testing time of the corrosion resistance test. If the coated metal material 1 is for automobile parts and the electrodeposition coating film 4 is a coating film made from an automobile paint, the temperature of the coated metal material 1 is suitably controlled to be less than about 90° C., preferably about 80° C. or less, because the coating film generally has a glass transition temperature of about 90° C. or more.

For the control of the temperature of the coated metal material 1 and the temperature of the water-containing material 6 near the interface between the electrodeposition coating film 4 and the water-containing material 6, the temperature of the water-containing material 6 near the interface between the electrodeposition coating film 4 and the water-containing material 6 is measured using a thermometer so as to confirm that the temperature is controlled to the predetermined temperature.

In the temperature control step S4, the water-containing materials 6 which are disposed on the surface of the electrodeposition coating film 4 and have their temperatures controlled may be held for a predetermined time before the current is supplied. The predetermined time in the temperature control step S4, that is, the temperature holding time, is preferably 1 min or more to 1 day or less, more preferably 10 min or more to 120 min or less, particularly preferably 15 min or more to 60 min or less.

Holding the water-containing materials 6 which are disposed on the surface of the electrodeposition coating film 4 and have their temperatures controlled promotes, in advance, permeation of the water-containing materials 6 into the electrodeposition coating film 4. Specifically, the holding promotes, in advance, permeation of water into and movement of ions to the electrodeposition coating film 4, specifically as illustrated in a dotted pattern of FIG. 3. This means that the simulated state where the corrosion resistance time has ended is reproduced in the entire measurement target portion 4A to be closer to the actual corrosion process. Accordingly, the corrosion of the coated metal material 1 smoothly progresses in the current supply step S5, thereby allowing promotion of the progress of the expansion of the electrodeposition coating film 4 for evaluating the corrosion progress rate representing the progress of corrosion. This enables a reduction in the testing time and improvement in the reliability of the corrosion resistance test.

<<Current Supply Step>>

In the current supply step S5, the current supplier 8 supplies a current between one of the electrodes 12 serving as an anode and the other electrode 12 serving as a cathode to bring corrosion of the coated metal material 1 to progress.

Specifically, the current supplier 8 is actuated to supply the current to the steel sheet 2 of the coated metal material 1 through the external circuit 7 via the electrodes 12, the water-containing material 6, and the electrodeposition coating film 4. The current supply is controlled at a constant current value so that the current value is maintained at a fixed value, for example.

Specifically, FIG. 3 illustrates the left electrode 12 connected to the negative electrode side of the current supplier 8, and the right electrode 12 connected to the positive electrode side of the current supplier 8. In the state of FIG. 3, when the current is supplied, the reduction reaction progresses at the interface of the left electrode 12 with the water-containing material 6. Thus, the left electrode 12 serves as a cathode.

Further, the left damaged portion 5 is in contact with the same water-containing material 6 as in contact with the left electrode 12. Thus, an anode reaction in which Fe elutes from the steel sheet 2 (Fe→$Fe^{2+}$+$2e^-$) progresses in the exposing portion 5A of the steel sheet 2 at the left damaged portion 5. In other words, the left damaged portion 5 serves as an anode site.

Electrons $e^-$ generated by the anode reaction at the anode site move to the right damaged portion 5 through the steel sheet 2. Then, the exposing portion 5A of the steel sheet 2 at the right damaged portion 5 is in contact with the water-containing material 6. A cathode reaction in which dissolved oxygen and hydrogen ions in water are reduced to generate a hydroxyl group $OH^-$ and hydrogen thus progresses. In other words, the right damaged portion 5 serves as a cathode site. At the right damaged portion 5, electrolysis of water also progresses to generate hydrogen, depending on the conditions of the current supply.

Further, the water-containing material 6 in contact with the right damaged portion 5 is also in contact with the right electrode 12. Thus, an oxidation reaction progresses at the interface of the right electrode 12 with the water-containing material 6. Accordingly, the right electrode 12 serves as an anode.

At the damaged portion 5 serving as an anode site, the anode reaction progresses, and the progress of the cathode reaction is reduced. Thus, the electrodeposition coating film 4 hardly expands.

With the progress of the cathode reaction at the damaged portion 5 serving as the cathode site, $OH^-$ is generated. This brings the area around the damaged portion 5 to be in an alkaline environment. This damages the under-treated surface (chemically converted surface) of the steel sheet 2, thereby reducing adherence of the electrodeposition coating film 4. Accordingly, the electrodeposition coating film 4 is lifted and expanded around the damaged portion 5. The electrodeposition coating film 4 with a reduced adherence to the steel sheet 2 in the alkaline environment is further lifted by the hydrogen generated due to electrolysis of water and reduction of $H^+$. This causes progression of the expansion of the electrodeposition coating film 4.

Such progress of the cathode reaction and occurrence and progress of expansion of the electrodeposition coating film 4 around the damaged portion 5 are accelerated reproduction of actual corrosion of the coated metal material 1. Specifically, the occurrence and progress of the expansion of the electrodeposition coating film 4 around the damaged portion 5 is a simulated progress of the corrosion of the coated metal material 1. In this way, the progress degree of the corrosion of the coated metal material 1 can be evaluated by evaluation of the size of the expansion of the electrodeposition coating film 4 at the time when predetermined time has elapsed from the start of the current supply. In particular, the rate of increase in the size of the expansion of the electrodeposition coating film 4 corresponds to the corrosion progress rate, out of the process of corrosion of the metal described above. Accordingly, the rate of increase in the size of expansion of the electrodeposition coating film 4 obtained as the progress degree of corrosion of the coated metal material 1 enables accurate evaluation of the corrosion resistance related to the corrosion progress rate of the coated metal material 1.

FIG. 6 shows appearance photographs of specific examples of the anode sites and the cathode site.

Specifically, first, a steel sheet 2 (SPC) serving as a metal base was provided with an epoxy resin-based electrodeposition coating film 4 (baking conditions: 140° C.×15 min, thickness: 10 μm) via a chemical conversion coating 3 (zinc phosphate coating; chemical conversion treatment time, 120 sec) to produce a coated metal material 1, which was used as a MUT A. Two damaged portions 5 were artificially formed in the surface of the electrodeposition coating film 4 in the MUT A using a Vickers hardness tester. The diameters of the damaged portions 5 were each 1 mm, and the distances therebetween was 4 cm. Then, a constant current of 1 mA was applied to the MUT A at 50° C. for 5 minutes using a mixture as a water-containing material 6. The mixture was obtained by mixing 50 g of sodium chloride as an electrolyte material and 500 g of kaolinite in 1.3 L of water.

FIG. 6 shows the anode site and the cathode site after the corrosion resistance test. For the cathode site, the "appearance photograph (before peeling)" is the photograph of the surface of the coated metal material 1 after the test. The "appearance photograph (after peeling)" is the photograph of the surface of the coated metal material 1 from which an expanded portion of the electrodeposition coating film 4 is peeled off with an adhesive tape. At the cathode site, the damaged portion 5 and the expansion of the electrodeposition coating film 4 around the damaged portion 5 are observed. At the anode site, the formation of the damaged portion 5 but almost no expansion of the electrodeposition coating film 4 can be observed.

The cathode reaction may progress also at the anode site depending on the film quality of the electrodeposition coating film 4, the size, shape, and other parameters of the damaged portions 5, and conditions in current supply with the current supplier 8 such as a current value. Specifically, the damaged portion 5 at which the anode reaction progresses, and the damaged portion 5 at which the cathode reaction progresses out of two damaged portions 5 are suitably separated, but may not be separated clearly. In this case, the expansion of the electrodeposition coating film 4 may progress also at the anode site. In such a case, the expansion of the electrodeposition coating film 4 may progress at both of the damaged portions 5. Thus, in the calculation step S7 to be described later, the progress degree of corrosion of the coated metal material 1 is calculated based on the damaged portion 5 with larger expansion of the electrodeposition coating film 4.

In the current supply step S5, the current supply brings anions (e.g., $Cl^-$) or cations ($Na^+$) in an electrolyte component in the water-containing material 6 to move toward the steel sheet 2 through the electrodeposition coating film 4. These ions are hydrated. The water thus permeates into the electrodeposition coating film 4 as the ions move. Further, the electrodes 12 disposed to surround the respective damaged portions 5 allow a voltage to be stably applied to the electrodeposition coating film 4 around each of the damaged portions 5. This leads to efficient movement of ions to and efficient permeation of water into the electrodeposition coating film 4 at the time of current supply. The current supply accelerates movement of ions to and permeation of water into the electrodeposition coating film 4 around the damaged portions 5 in this manner. Thus, the flow of the current is rapidly stabilized. Accordingly, progress of the expansion of the electrodeposition coating film 4 at the damaged portions 5 is stabilized.

In this manner, the present embodiment allows separation between the anode site at which the anode reaction progresses with current supply, and a cathode site at which the cathode reaction progresses with current supply, and further allows stable acceleration of the progress of both reactions at the respective damaged portions 5 and of the progress of the expansion of the electrodeposition coating film 4. This enables a corrosion resistance test for the coated metal material 1 to be performed accurately in a really short time.

The corrosion resistance test method according to the present embodiment is characterized in that the viscosity of the water-containing material 6 at 65° C. is in the above-described range.

Figure 7:
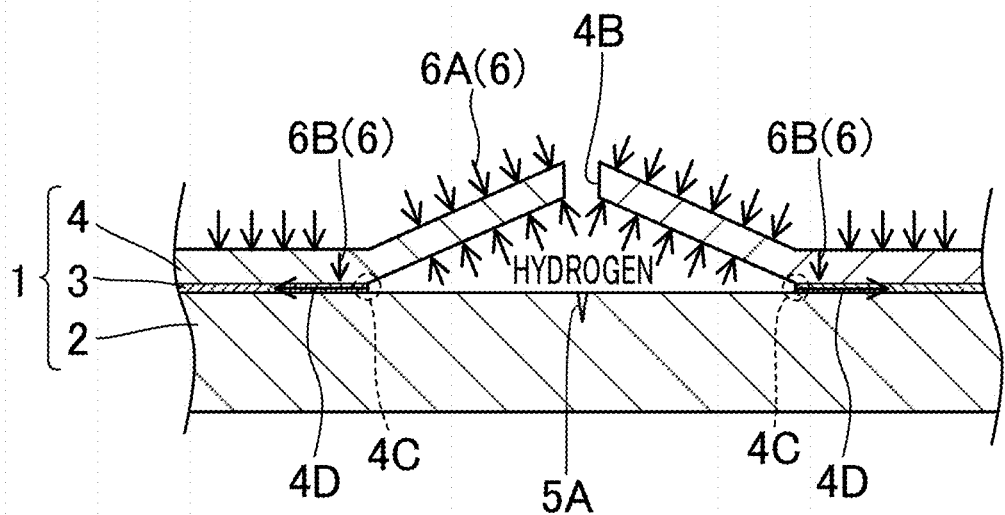
FIG. 7 illustrates a relationship between the viscosity of the water-containing material and the progress of expansion of the electrodeposition coating film.

The viscosity of about 5 mass % salt water at 65° C. is less than 10 mPa·s. In contrast, in the present embodiment, the viscosity of the water-containing material 6 is set to be higher. The use of the water-containing material 6 having a viscosity in the above-described range in the corrosion resistance test according to the present embodiment increases the resistance force 6A of the water-containing material 6 acting on the electrodeposition coating film 4 as shown in FIG. 7, as compared with the use of the commonly used salt water having a viscosity of less than 10 mPa·s. In this manner, hydrogen generated in the contact portion between the water-containing material 6 and the steel sheet 2 is less likely to be released from, for example, a break 4B of the electrodeposition coating film 4, and is retained in a gap between the electrodeposition coating film 4 and the steel sheet 2. Thus, the internal pressure of the gap between the electrodeposition coating film 4 and the steel sheet 2 increases. Further, the water-containing material 6 permeates through the electrodeposition coating film 4 as shown in the arrows 6B, enters a gap between the electrodeposition coating film 4 and the steel sheet 2 from, for example, a break 4B, is guided to the surface of the lifted electrodeposition coating film 4 closer to the steel sheet 2, and efficiently supplied to the tip portion 4C from which the expansion of the electrodeposition coating film 4 progresses. This further progresses the cathode reaction at the tip portion 4C. In this manner, as indicated by arrows 4D, the progress of the cathode reaction and the increase in the internal pressure by hydrogen accelerate lifting of the electrodeposition coating film 4 at the tip portion 4C. This further accelerates the progress of the expansion of the electrodeposition coating film 4.

As shown in the evaluation of defoamability of hydrogen, which will be described later, the excessive increase in the viscosity of the water-containing material 6 excessively suppresses releasing of hydrogen, which may suppress progress of the corrosion.

The current value in the current supply step S5 is preferably 10 μA or more to 10 mA or less, more preferably 100 μA or more to 5 mA or less, particularly preferably 500 μA or more to 2 mA or less. The current value less than 10 μA reduces accelerated reproducibility of the corrosion, and needs a long period of time for the test. On the other hand, the current value exceeding 10 mA makes the rate of the corrosion reaction unstable, which reduces the correlation with the progress of actual corrosion. Setting the current value within the range described above achieves both a reduction in the testing time and an improvement in the reliability of the test.

The time for the current supply in the current supply step S5 may be, for example, 0.05 hour or more to 24 hours or less in order to obtain sufficient spread of the expansion of the electrodeposition coating film 4. The time for the current supply may be preferably 0.1 hour or more to 10 hours or less, more preferably 0.1 hour or more to 5 hours or less. If the temperature is kept at a predetermined temperature for a predetermined time in the temperature control step S4 before the current supply, the time for the current supply can be preferably 0.1 hour or more to 1 hour or less.

A constant current is suitably applied between the electrodes 12 as described above, but a constant voltage may be applied.

Under the constant current control, the current value varies a little at the beginning of current supply, but may be controlled to be approximately the setting value. The current supply under the constant current control stabilizes the current value directly involved in the acceleration of corrosion, thereby improving the accelerated reproducibility of corrosion. Accordingly, the reliability of the corrosion resistance test can be improved.

In contrast, under the constant voltage control, the current value may vary greatly due to the degree of permeation of the water-containing material 6 into the electrodeposition coating film 4, variations in the resistance value with deterioration or rusting of the chemical conversion coating 3, and other factors, which is disadvantageous in accelerated reproducibility of corrosion. Keeping the temperature at a predetermined temperature for a predetermined time in the temperature control step S4 before the current supply allows acceleration of the permeation of the water-containing material 6 into the electrodeposition coating film 4 prior to the current supply step S5, which may reduce variations in the current value even under the constant voltage control. The state of progress of or the degree of corrosion in the course of corrosion progress may be determined from the plot of current (waveform of current) under the constant voltage control.

<<Second Measurement Step>>

The second measurement step S6 is a step of measuring the size of the expansion of the electrodeposition coating film 4.

When the diameter of the damaged portion 5 is measured as the size of the damaged portion 5 in the first measurement step S2, the size of the expansion of the electrodeposition coating film 4 is obtained by measuring, for example, the size, i.e., the expansion diameter of an expanded portion around the damaged portion 5 appeared due to the expansion of the electrodeposition coating film 4 (see the appearance photograph of the cathode site (before peeling) in FIG. 6). For the measurement of the size of the expansion of the electrodeposition coating film 4, an adhesive tape may be bonded to the electrodeposition coating film 4 to remove the expanded portion of the electrodeposition coating film 4 after the corrosion resistance test, and the diameter, i.e., the peeling diameter, of the exposed surface of the steel sheet 2 may be measured (see the appearance photograph of the cathode site (after peeling) in FIG. 6)).

Specifically, in the second measurement step S6, an image of the periphery of the damaged portion 5 before or after peeling is taken with the camera 51. The arithmetic unit 91 measures the expansion diameter or the peeling diameter on the obtained image data.

In the calculation step S7 to be described later, the expansion diameter or the peeling diameter used to calculate the progress degree of corrosion is the expansion diameter or peeling diameter of the damaged portion 5 with the larger expansion of the electrodeposition coating film 4.

Thus, in the second measurement step S6, if the expansion of the electrodeposition coating film 4 at one of the damaged portions 5 is obviously larger than that at the other damaged portion 5, the expansion diameter or peeling diameter of the damaged portion 5 with the larger expansion of the electrodeposition coating film 4 may only be measured. Specifically, if the expansion of the electrodeposition coating film 4 at the cathode site is obviously larger than that at the anode site, only the image of the cathode site may be taken to measure the expansion diameter or the peeling diameter.

If the expansions of the electrodeposition coating films 4 at both sites have approximately the same size, images of both of them may be taken to measure their expansion diameter or peeling diameter, and the expansion with the larger expansion diameter or peeling diameter may be selected based on the measurement results.

When the area of the damaged portion 5 is measured as the size of the damaged portion 5 in the first measurement step S2, the area of the expansion of the electrodeposition coating film 4 may be measured as the size of the expansion. Specifically, the expansion area or peeling area may be measured as the size of the expansion of the electrodeposition coating film 4.

The size of the expansion of the electrodeposition coating film 4 may vary depending on the material forming the coated metal material 1, the film quality of the electrodeposition coating film 4, the conditions of the test of the corrosion resistance test, and the like. In order to obtain sufficient corrosion acceleratory, the size of the expansion of the electrodeposition coating film 4 may be in the following range, for example. Specifically, the expansion diameter or peeling diameter as the size of the expansion of the electrodeposition coating film 4 is preferably 0.4 mm or more to 20 mm or less, more preferably 0.6 mm or more to 17 mm or less, particularly preferably 1 mm or more to 15 mm or less. The expansion area or peeling area as the size of the expansion of the electrodeposition coating film 4 is preferably 0.1 mm$^2$ or more to 320 mm$^2$ or less, more preferably 0.2 mm$^2$ or more to 230 mm$^2$ or less, particularly preferably 0.5 mm$^2$ or more to 180 mm$^2$ or less.

For the MUT B and the test conditions used in the corrosion resistance test of Examples and Comparative Examples, which will be described later, the expansion diameter or peeling diameter as the size of the expansion of the electrodeposition coating film 4 is preferably 4.5 mm or more, more preferably 5.0 mm or more, and preferably 10 mm or less. For the MUT B and the test conditions, the expansion area or peeling area as the size of the expansion of the electrodeposition coating film 4 is preferably 10 mm$^2$ or more, more preferably 13 mm$^2$ or more, and preferably 80 mm$^2$ or less.

The size of the expansion of the electrodeposition coating film 4 less than the lower limit causes insufficient progress of the corrosion, which may result in reduction in reliability of the corrosion resistance test. Too large expansion of the electrodeposition coating film 4 may require longer time for current supply in the current supply step S5 particularly for the coated metal material 1 with a high film quality in order to generate such a large expansion. The size of the expansion of the electrodeposition coating film 4 in the above-described range allows the size of the expansion of the electrodeposition coating film 4 to be calculated accurately and easily and allows the corrosion acceleratory to be improved, which enables a corrosion resistance test to be performed with higher reliability in a shorter time.

<<Calculation Step>>

In the calculation step S7, the progress degree of the corrosion of the coated metal material 1 is calculated based on the size of the damaged portion 5 measured in the first measurement step S2 and the size of the expansion of the electrodeposition coating film 4 measured in the second measurement step S6.

As mentioned above, checking how much the electrodeposition coating film 4 is expanded at the time when the predetermined time has elapsed since the start of current supply in the current supply step S5 allows the progress degree of corrosion of the coated metal material 1 to be obtained.

An index representing the progress degree of corrosion includes the difference between the size of the damaged portion 5 measured in the first measurement step S2 and the size of the expansion of the electrodeposition coating film 4 measured in the second measurement step S6, and the progress rate of expansion of the electrodeposition coating film 4, and is preferably the progress rate of expansion of the electrodeposition coating film 4. This is because the progress rate of the expansion of the electrodeposition coating film 4 corresponds to the corrosion progress rate. Herein, the progress rate of expansion of the electrodeposition coating film 4" may also be referred to as the "rate of corrosion progress."

For example, the rate of corrosion progress is calculated as follows as the progress degree of corrosion. Specifically, based on the diameter or area of the damaged portion 5 measured in the first measurement step S2, the expansion diameter or peeling diameter, or the expansion area or peeling area measured in the second measurement step S6, an expanded distance of or area of an expanded region of the electrodeposition coating film 4 during the current supply is calculated as for one of the damaged portions 5 with the larger expansion of the electrodeposition coating film 4. Based on the expanded distance or area of the expanded region, and the time for current supply in the current supply step S5, the progress rate of expansion of the electrodeposition coating film 4 is calculated.

Specifically, for example, for calculation of the rate of corrosion progress of the electrodeposition coating film 4 from the diameter of the damaged portion 5 and the peeling diameter of the electrodeposition coating film 4, the rate of corrosion progress is obtained by dividing a distance over which corrosion has progressed by a time for which a current is supplied. The distance is ½ of the difference between the diameter of the damaged portion 5 and the peeling diameter of the electrodeposition coating film 4. The rate of corrosion progress obtained in this manner may vary depending on the material forming the coated metal material 1, the film quality of the electrodeposition coating film 4, the conditions of the corrosion resistance test, and the like. In order to obtain sufficient corrosion acceleratory, the rate of corrosion progress is, for example, desirably 0.3 mm/h or more, preferably 0.4 mm/h or more, more preferably 0.7 mm/h or more. For the MUT B and the test conditions used in the corrosion resistance test of Examples and Comparative Examples, which will be described later, the rate of corrosion progress is preferably 3.7 mm/h or more, more preferably 4.2 mm/h or more. The upper limit of the rate of corrosion progress is not particularly limited, but is, in order to obtain the ease in measurement and reliability of the test, for example, 20 mm/h or less, preferably 10 mm/h or less.

The progress degree of corrosion calculated in the calculation step S7 can be used to evaluate the corrosion resistance of the coated metal material 1 in connection with the actual corrosion test, for example. Specifically, for example, the relationship between the progress degree of corrosion obtained in the corrosion resistance test and the corrosion progress rate obtained in the actual corrosion test is determined in advance, to allow the correspondence of the result of the corrosion resistance test with the corrosion resistance of the actual corrosion test to be checked.

EXAMPLE

Specific examples will be described below.
<<Corrosion Resistance Test>>

Examples and Comparative Example

First, on a surface of a steel sheet 2 (SPC) serving as a metal base, an epoxy resin-based electrodeposition coating film 4 (baking conditions: 150° C.×20 min, thickness: 10 μm) was provided via a chemical conversion coating 3 (zinc phosphate coating; chemical conversion treatment time, 30 sec) to produce a coated metal material 1, which was used as a MUT B.

Damaged portions 5 were artificially formed in the surface of the electrodeposition coating film 4 in the MUT B using a Vickers hardness tester with a load of 30 kg. The damaged portions 5 were formed to have the same diameter at two positions at a distance of 4 cm from each other. The diameter of each of the damaged portions 5 was 0.8 mm.

A SUS tray was placed on a heater surface of a hot plate 41, and a surface of the tray was covered with a polyvinylidene chloride film (thickness: 11 μm) serving as an insulating portion 44. The tray was provided to block contamination of the hot plate 41 in case of leakage of a water-containing material 6.

The MUT B was placed on the film of the tray with the surface of the MUT B provided with the electrodeposition coating film 4 facing upward.

In this state, a resistance value between the heater surface of the hot plate 41 and the steel sheet 2 of the MUT B was measured using a commercially available tester (unable to measure a resistance value exceeding 20 MΩ, and displays a resistance value below 0.1Ω as 0 (zero) Q). The resistance value was unmeasurable (more than 20 MΩ), indicating that sufficient insulation was secured between the heater surface of the hot plate 41 and the steel sheet 2.

Then, the container 30 and other components were placed on the MUT B in the manner shown in FIG. 1. The flexible heater 43 and the second insulating portion 44 were not disposed. Then, the water-containing material 6 was placed in each of the water-containing material holders 11. Table 1 shows the mixing rate of the components for the water-containing material 6 used. The components used for the water-containing material 6 are as follows: water; ion-exchanged water;

NaCl (Sodium Chloride); NaCl (99%) manufactured by Naikai Salt Industries Co., Ltd.; a thickener: ADEKA NOL UH-526 (polyether polyol-based urethane polymer) manufactured by ADEKA CORPORATION.

TABLE 1

|  |  | Comparative Examples | | | | Examples | | |
| --- | --- | --- | --- | --- | --- | --- | --- | --- |
|  |  | 1<br>C1 | 2<br>C2 | 3<br>C3 | 4<br>C4 | 1<br>E1 | 2<br>E2 | 3<br>E3 |
| Mixing Ratio of | Water |  |  |  | Balance | | | |
| Components for | NaCl | 5.0 | 5.0 | 5.0 | 4.9 | 4.8 | 4.8 | 4.5 |
| Water-containing | Thickener | 0 | 0.5 | 1.0 | 3.0 | 4.0 | 5.0 | 10.0 |
| Material (mass %) |  |  |  |  |  |  |  |  |
|  | Total |  |  |  | 100 | | | |
| Viscosity (mPa · s) |  | less than 10 | less than 10 | less than 10 | less than 10 | 10 | 20 | 30 |
| Peeling Diameter (mm) |  | 0.8 | 1.7 | 4.2 | 4.3 | 4.8 | 5.9 | 6.4 |
| Rate of Corrosion Progress (mm/h) |  | 0 | 0.9 | 3.4 | 3.5 | 4.0 | 5.1 | 5.6 |
| Corrosion Acceleratory |  | Poor | Poor | Fair | Fair | Good | Excellent | Excellent |
| Defoamability of Hydrogen |  | Good | Good | Good | Good | Good | Good | Good |

|  |  | Examples | | Comparative Examples | | | | | | |
| --- | --- | --- | --- | --- | --- | --- | --- | --- | --- | --- |
|  |  | 4<br>E4 | 5<br>E5 | 5<br>C5 | 6<br>C6 | 7<br>C7 | 8<br>C8 | 9<br>C9 | 10<br>C10 | 11<br>C11 |
| Mixing Ratio of | Water |  |  |  |  | Balance | | | | |
| Components for | NaCl | 4.3 | 4.2 | 4.2 | 4.2 | 4.1 | 4.0 | 3.9 | 3.5 | 2.8 |
| Water-containing | Thickener | 15.0 | 15.5 | 16.0 | 17.0 | 19.0 | 21.0 | 23.0 | 30.0 | 45.0 |
| Material (mass %) |  |  |  |  |  |  |  |  |  |  |
|  | Total |  |  |  |  | 100 | | | | |
| Viscosity (mPa · s) |  | 40 | 40 | 50 | 60 | 70 | 80 | 90 | 190 | 470 |
| Peeling Diameter (mm) |  | 5.6 | 4.9 | 4.2 | 3.9 | 2.9 | 2.8 | 0.9 | 0.8 | 0.8 |
| Rate of Corrosion Progress (mm/h) |  | 4.8 | 4.1 | 3.4 | 3.1 | 2.1 | 2.0 | 0.1 | 0 | 0 |
| Corrosion Acceleratory |  | Excellent | Good | Fair | Fair | Fair | Fair | Poor | Poor | Poor |
| Defoamability of Hydrogen |  | Good | Good | Fair | Fair | Fair | Fair | Poor | Poor | Poor |

The total content of the electrolyte material in the water-containing material 6 was 2.8 mass % to 5.0 mass %. As the water-containing material 6, a material obtained by adding a thickener to salt water, sufficiently stirring the mixture, and allowing the mixture to stand overnight was used. The salt water was obtained by dissolving NaCl in ion-exchanged water.

The temperature of the hot plate 41 was controlled to keep the temperature of the water-containing material 6 near the interface between the electrodeposition coating film 4 and the water-containing material 6 at 65° C. for 30 minutes (temperature control step).

A constant current of 1 mA was applied between the two electrodes 12 for 30 min in the state of FIG. 3.

—Viscosity of Water-Containing Material—

The water-containing material 6 was warmed to 65° C., and the viscosity of the water-containing material 6 was then measured using a B type viscometer (VISCOTESTERVT-06, manufactured by RION Co., Ltd.) and a No. 3 cup/rotor, one minute after the start of revolution at 62.5 rpm. The measurement values obtained by the viscometer were in increments of 10 mPa·s.

—Peeling Diameter—

After the application of the constant current, the water-containing material 6 was removed, and the surface of the MUT B was cleaned with water. Then, an expanded portion of the electrodeposition coating film 4 was removed with an adhesive tape (No. 405, manufactured by NICHIBAN Co., Ltd.). The peeling diameter was then measured. Table 1 shows the results.

The test for each of Comparative Examples 1, 10, and 11 was performed only once. The test for each of Examples 1 to 5 and Comparative Examples 2 to 9 was performed twice or three times under completely the same condition. The value of the peeling diameter of each of Examples 1 to 5 and Comparative Examples 2 to 9 shown in Table 1 is an average value of values of the peeling diameter obtained in two or three tests.

—Rate of Corrosion Progress—

The rate of corrosion progress was calculated based on the following equation (1).

$$\text{Rate of Corrosion Progress(mm/h)} = (\text{Peeling Diameter (mm)} - \text{Diameter of Damaged Portion}(0.8 \text{ mm}))/2 \times 0.5(\text{h})) = \text{Peeling Diameter (mm)} - \text{Diameter of Damaged Portion}(0.8 \text{ mm}) \quad (1)$$

—Corrosion Acceleratory—

The corrosion acceleratory was evaluated from the results of the peeling diameters shown in Table 1 using the following criteria:

Excellent: The peeling diameter is 5.0 mm or more;
Good: The peeling diameter is 4.5 mm or more to less than 5.0 mm;
Fair: The peeling diameter is 2.0 mm or more to less than 4.5 mm;
Poor: The peeling diameter is less than 2.0 mm, or a current does not flow.

That is, the peeling diameter of 4.5 mm or more was evaluated as Good in corrosion acceleratory. Particularly, the peeling diameter of 5.0 mm or more was evaluated as Excellent in corrosion acceleratory.

The peeling diameter of 2.0 mm or more to less than 4.5 mm was evaluated as not good (Fair) in corrosion acceleratory although the corrosion acceleratory was observed. The peeling diameter of less than 2.0 mm, or non-progress of corrosion due to current non-flowing in the current supply step S5 was evaluated as Poor in corrosion acceleratory.

<<Defoamability of Hydrogen>>

If releasing (defoaming) of hydrogen from a gap between the electrodeposition coating film 4 and the steel sheet 2 is excessively suppressed in the current supply step S5 of the corrosion resistance test, the gap becomes large, which may suppress a sufficient contact between the water-containing material 6 and the steel sheet 2. Then, the progress of the cathode reaction is suppressed. This causes non-flowing of a current, and in turn, non-progress of corrosion.

The defoamability of hydrogen was evaluated based on the ease of current flow in the current supply step S5, using the following criteria:

Good: A current of 1 mA flows as set.
Fair: A current sometimes flows and sometimes does not flow.
Poor: A current does not flow.

<<Consideration>>

—Peeling Diameter and Corrosion Acceleratory—

Figure 8:
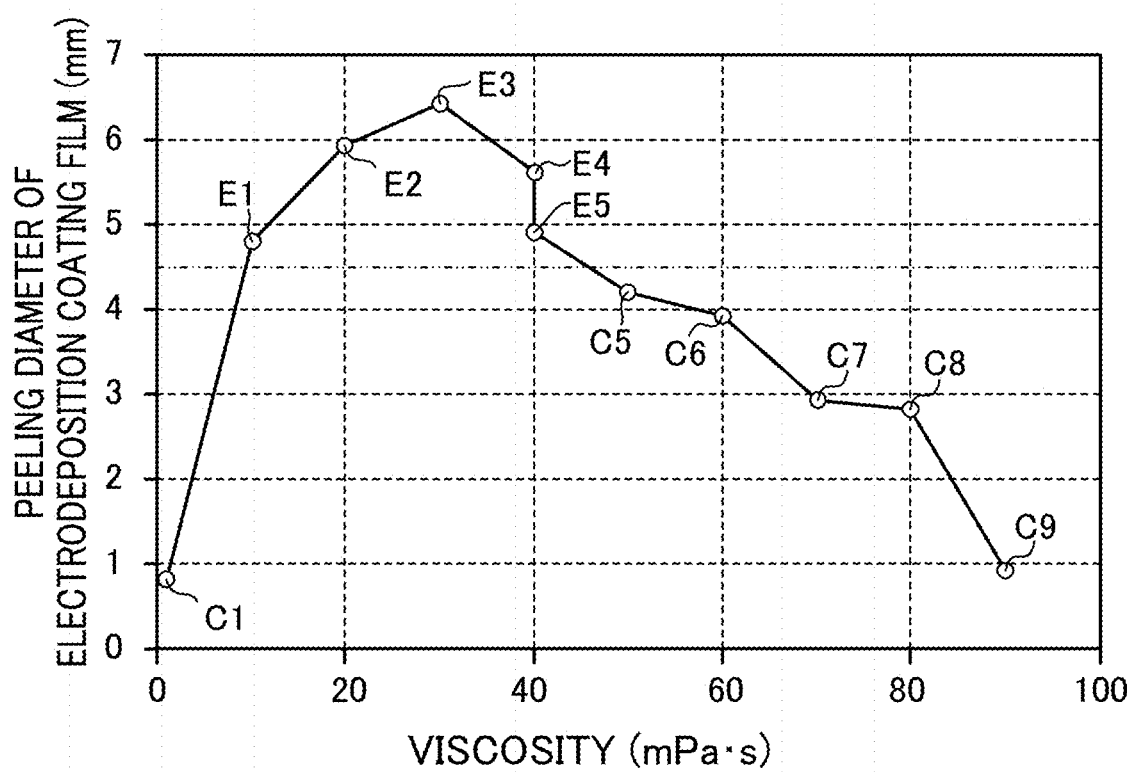
FIG. 8 is a graph showing a relationship between the viscosity of the water-containing material and the peeling diameter of the electrodeposition coating film.
Figure 9:
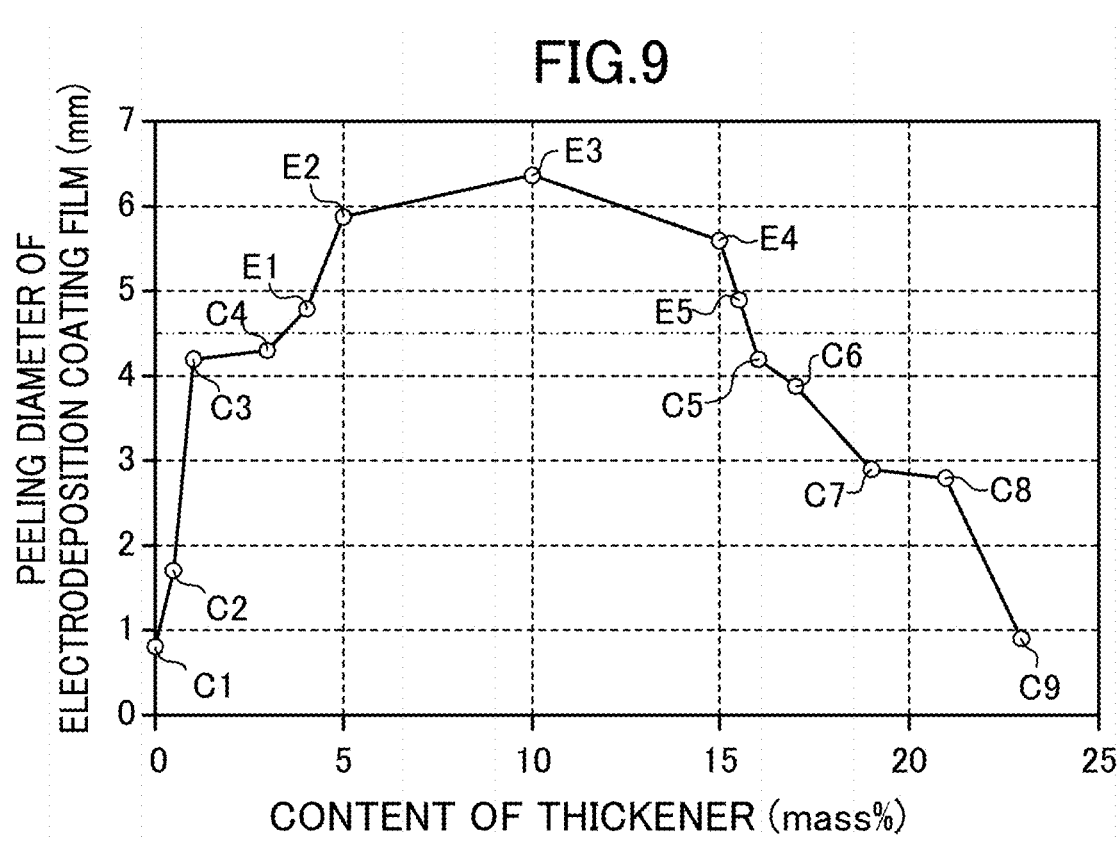
FIG. 9 is a graph showing a relationship between the content of a thickener and the peeling diameter of the electrodeposition coating film.

FIG. 8 is a graph obtained by plotting the peeling diameter shown in Table 1 against the viscosity of the water-containing material 6. FIG. 9 is a graph obtained by plotting the peeling diameter against the content of the thickener. In FIGS. 8 and 9, a threshold value 4.5 mm, which is a boundary between Good and Fair in the evaluation of corrosion acceleratory in Table 1 is indicated by a chain double-dashed line.

FIG. 8 is shown provided that the viscosity of Comparative Example 1 is 1 mPa·s, and data of Comparative Examples 2 to 4 are omitted. The viscosities of Examples 4 and 5 are both 40 mPa·s due to the measurement limit of the viscosity used. However, it can be inferred that the viscosity in Example 5 is in the range of 40 mPa·s or more to less than 45 mPa·s and is higher than the viscosity in Example 4, based on the data of other Examples and Comparative Examples.

As can be seen from Table 1 and FIGS. 8 and 9, the viscosity of the water-containing material 6 increases with the increase in the content of the thickener in the water-containing material 6. The peeling diameter was 4.5 mm or more at the content of the thickener in the range of 4.0 mass % or more to 15.5 mass % or less (Examples 1 to 5), i.e., the viscosity of the water-containing material 6 in the range of 10 mPa·s or more and 40 mPa·s or less, which exhibited really high corrosion acceleratory. The peeling diameter was 5.0 mm or more particularly at the content of the thickener in the water-containing material 6 in the range of 5.0 mass % or more to 15.0 mass % or less (Examples 2 to 4), i.e., the viscosity of the water-containing material 6 in the range of 20 mPa·s or more to 40 mPa·s or less, which exhibited really high corrosion acceleratory.

The peeling diameter was less than 4.5 mm at the content of thickener in the water-containing material 6, being 4.0 mass % (Comparative Examples 1 to 4) or exceeding 15.5 mass % (Comparative Examples 5 to 11), which exhibited low or inferior corrosion acceleratory.

—Defoamability of Hydrogen—

Comparative Examples 1 to 4 and Examples 1 to 5 showed high defoamability of hydrogen. Comparative Examples 5 to 8 showed poor defoamability. Comparative Examples 9 to 11 exhibited bad defoamability.

As can be seen, it was demonstrated that the defoamability of hydrogen decreases with the increase in the viscosity of the water-containing material 6 or the increase in the content of the thickener.

Second Embodiment

Now, other embodiments according to the present disclosure will be described in detail. In the description of these embodiments, the same reference characters as those in the first embodiment are used to represent equivalent elements, and the detailed explanation thereof will be omitted.

The description of the first embodiment will be made with reference to the case where a plurality of damaged portions 5 are formed in the coated metal material 1 at positions apart from each other, and two out of these damaged portions 5 are used.

The second embodiment is described below with reference to the case where the coated metal material 1 has a single damaged portion 5, or has a plurality of damaged portions 5 at positions apart from each other, and one of the damaged portions 5 is used.

Figure 10:
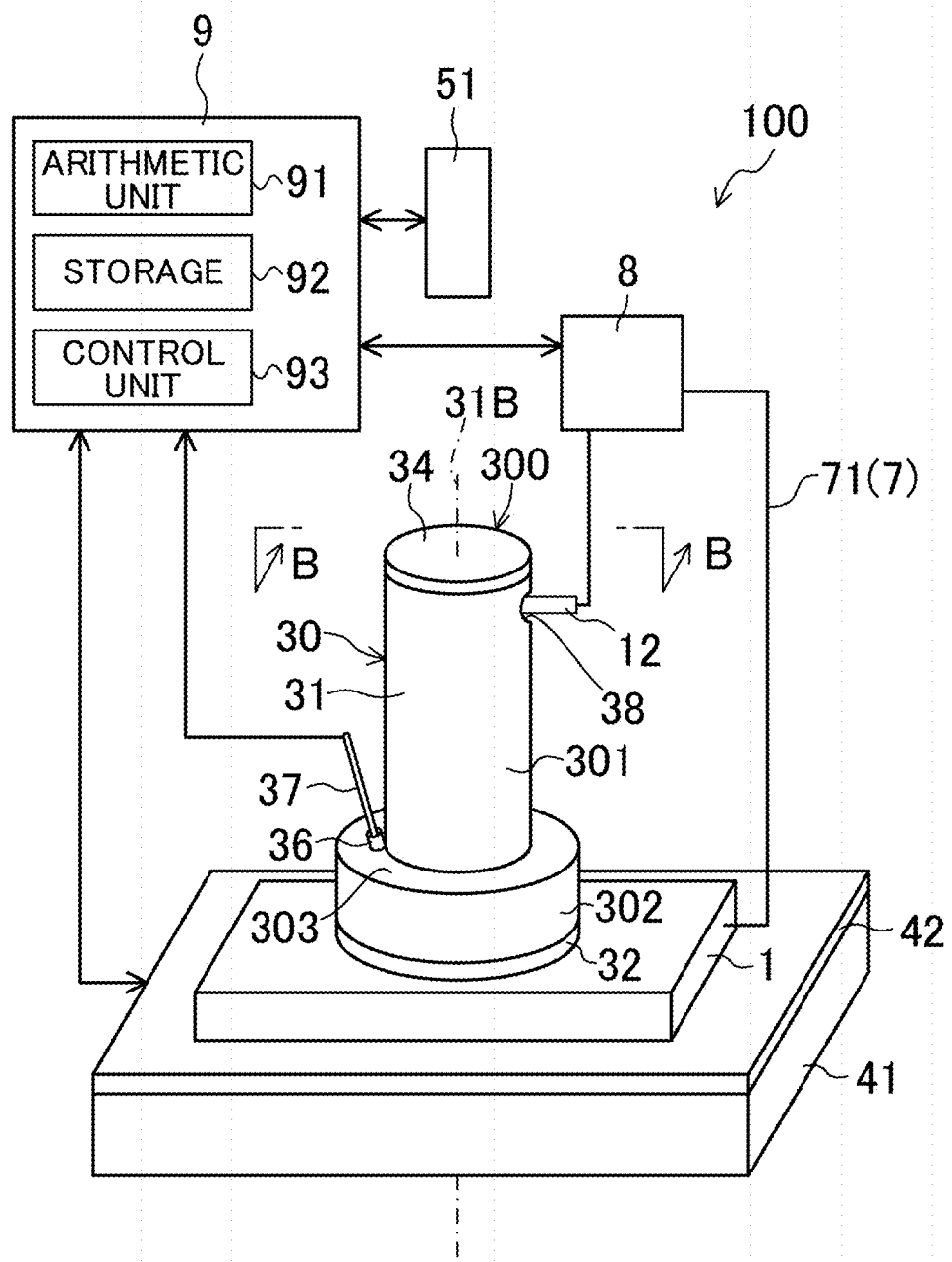
FIG. 10 illustrates an example corrosion resistance test apparatus according to a second embodiment.
Figure 11:
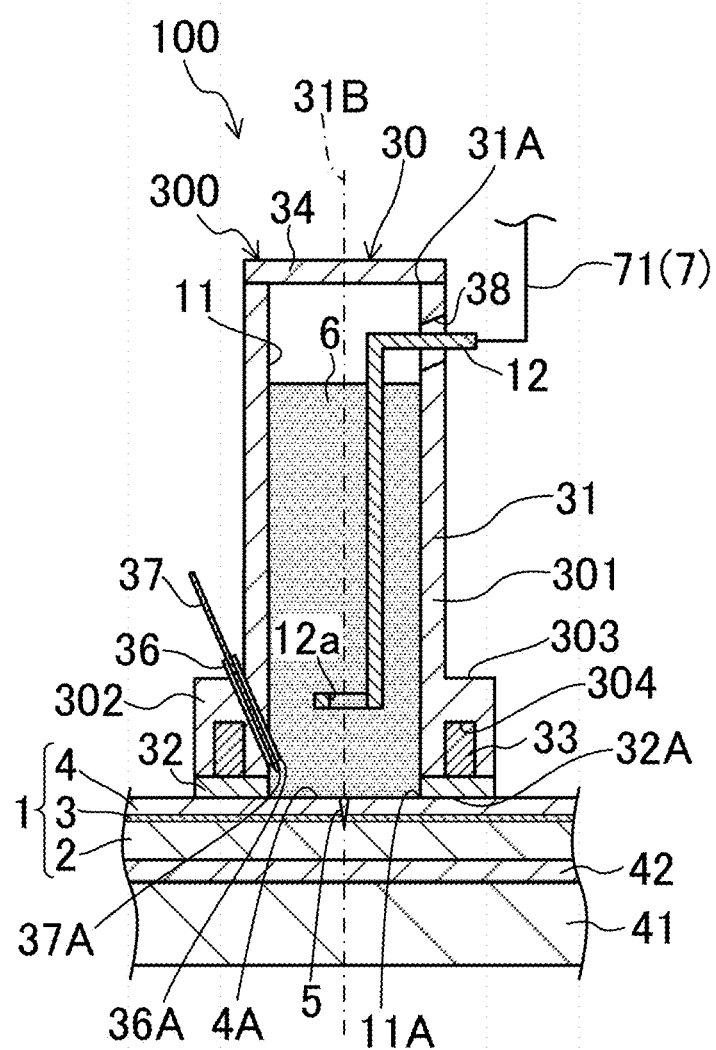
FIG. 11 is a cross-sectional view taken along line B-B shown in FIG. 10.
Figure 12:
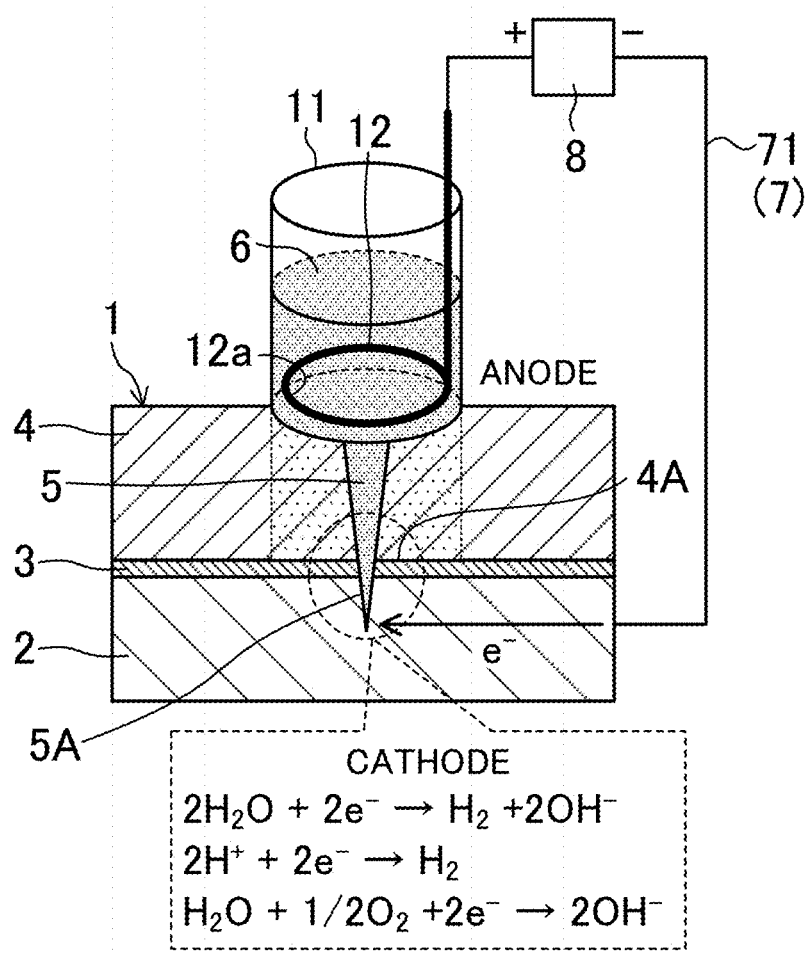
FIG. 12 illustrates the principle of a corrosion resistance test according to a second embodiment.

FIGS. 10 and 11 illustrate an example corrosion resistance test apparatus according to the second embodiment. FIG. 12 illustrates the principle of a corrosion resistance test method according to the second embodiment.

<Corrosion Resistance Test Apparatus>
<<Electrode Portion Device>>

The electrode portion device 300 of the second embodiment includes a single water-containing material holder 11. The electrode portion device 300 includes an optional temperature sensor 37 (a temperature detector).

—Container—

A container 30 includes a container body 31 provided with a single through hole 11. The container 30 further includes an optional lid 34, an optional side wall hole 38, and an optional hole 36.

[Container Body and Bottom Portion]

The container body 31 and a bottom portion 32 each having a single through hole 11 are members in a tubular shape such as a cylindrical shape and a polygonal tubular shape, preferably members in a cylindrical shape in order to reduce strain when thermally expanded.

The container body 31 has the same inner diameter as the bottom portion 32. The inside of the space defined by the inner circumferential surfaces of the container body 31 and the bottom portion 32, i.e., the through hole 11, constitutes the single water-containing material holder 11 for holding the water-containing material. The water-containing material holder 11 has an opening 11A provided in a bottom surface 32A. A region of the coated metal material 1 defined by the opening 11A serves as a measurement target portion 4A with the container 30 placed on the electrodeposition coating film 4 of the coated metal material 1.

In order to effectively reduce leaking of the water-containing material 6, the bottom portion 32 has a thickness of preferably more than 1 mm, and a hardness of preferably 50 or less as a type A durometer hardness defined in JIS K 6250, as shown in experimental examples to be described later. The upper limit of the thickness of the bottom portion 32 may be, but is not particularly limited to, for example, 10 mm or less, in order to obtain an advantage of the attractive force of a magnet 33, which will be described later, and to reduce a cost of the material for the bottom portion 32. The lower limit of the hardness of the bottom portion 32 may be, but is not particularly limited to, for example, 10 or more as a type A durometer hardness, in order for a product usable as the bottom portion 32 to be easily available. The suitable numerical ranges of the thickness and hardness of the bottom portion 32 are also applicable in other embodiments.

The base portion 302 and the extension portion 301 have the same inner diameter around the center axis 31B of the container body 31. The base portion 302 has a larger outer diameter than the extension portion 301.

Similarly to the first embodiment, a portion of the base portion 302 in the vicinity of the bottom portion 32 has a groove 304, in which a ring-shaped magnet 33 is placed. This can effectively reduce the displacement of the container 30. The magnet 33 is suitably sealed with, for example, a resin in the same manner as in the first embodiment.

The intensity of the magnet 33 is preferably 370 mT or higher, as shown in experimental examples to be described later. This configuration can secure higher adherence between the electrode portion device 300 and the coated metal material 1. The upper limit of the intensity of the magnet 33 may be, but is not particularly limited to, for example, 1300 mT or lower. The suitable numerical range of the intensity of the magnet 33 is also applicable in other embodiments.

Experimental Examples

A silicone mat serving as the bottom portion 32 made from a silicone resin was placed in a portion of the container body 31 made from an epoxy resin (the inner diameter of the water-containing material holder 11: 10 mm) in the vicinity of the bottom surface 32A, which was then placed on a flat table. Subsequently, water was introduced into the container body 31, which was then held for 10 minutes. Thereafter, the presence or absence of water leakage was checked. A ring-shaped neodymium magnet (manufactured by Magfine Corporation) had been embedded, using an epoxy resin, in a portion of the container body 31 in the vicinity of the bottom surface 32A. Table 2 shows the results. The hardness of the silicone mat was indicated by the type A durometer hardness defined in JIS K 6250.

TABLE 2

| | | Experimental Examples | | | |
|---|---|---|---|---|---|
| | | 1 | 2 | 3 | 4 |
| Magnet | Intensity (mT) | 367 | 367 | 380 | 380 |
| | Attractive Force (kgf) | 4.4 | 4.4 | 5.0 | 5.0 |
| Silicone Mat (Bottom Portion) | Hardness (Type A Durometer Hardness) | 70 | 50 | 50 | 50 |
| | Thickness (mm) | 0.5 | 0.5 | 1 | 1.5 |
| Presence or Absence of Water Leakage | | Present | Present | Present | Absent |

The results of Experimental Examples 1 to 4 demonstrate that water leakage can be more effectively reduced when the intensity of the magnet is higher, the hardness of the silicone mat is lower, and the thickness of the silicone mat is higher.

[Lid]

The lid 34 closes the upper opening 31A of the container body 31. The volatilization of a solvent component of the water-containing material 6 during the corrosion resistance test changes the concentration of a component of the water-containing material 6, which may reduce the reliability of the test. The lid 34 closing the upper opening 31A reduces releasing of a volatile component of the water-containing material 6 moving upward in the container body 31 to the outside. Accordingly, the reduction in water-containing material 6 during the test can be substantially prevented. Further, for the test performed with an increase in temperatures of the water-containing material 6 and the coated metal material 1, the temperature keeping efficiency can be increased.

Similarly to the container body 31, the lid 34 may be made from a resin material, such as an acrylic resin, an epoxy resin, and aromatic polyether ether ketone (PEEK) or from ceramic, particularly preferably made from a resin material, such as an acrylic resin, an epoxy resin, and an aromatic polyether ether ketone (PEEK). This allows reduction in the weight and cost of the electrode portion device 300, in turn, the corrosion resistance test apparatus 100, while securing insulation between the water-containing material holder 11 and the outside.

In particular, the use of the PEEK material as a material for the container body 31 and/or the lid 34 allows a reduction in erosion of the container body 31 and/or the lid 34 due to a malfunction of the hot plate 41 and/or the flexible heater 43 or other issues.

The container body 31 and the lid 34 may be made from different materials or the same material. The container body 31 and the lid 34 may be integral with or separate from each other.

The lid 34 can also be provided on the container 30 of the first embodiment. In this case, the lid 34 may be a single member covering the two water-containing material holders 11, or may be two members respectively covering the two water-containing material holders 11.

[Side Wall Hole]

The side wall hole 38 is a hole for releasing the internal pressure of the container 30, provided in the upper side wall of the container body 31 so as to penetrate the side wall. When the container 30 has the lid 34, the side wall hole 38 is suitably provided. During the corrosion resistance test, gases such as hydrogen may be generated through chemical reaction. In such case, complete sealing of the container body 31 increases the internal pressure of the container 30, which may lead to breakage of the container 30 and other issues. In the present configuration, gases generated during the test are removed through the side wall hole 38. This substantially prevents the increase in the internal pressure of the container 30. Moreover, the side wall hole 38 is provided in the upper side wall of the container body 31. This reduces leaking of the water-containing material 6, releasing of the volatile component of the water-containing material 6, and other issues, compared with the case where the side wall hole 38 is provided in the lower side wall, the lid 34, or the like.

The side wall hole 38 may also be used for pulling out the electrode 12 or wiring 71 of the external circuit 7 and/or for introducing the water-containing material 6.

The number of the side wall holes 38 may be one or more. The number of the side wall holes 38 is preferably one, two, or three. For single side wall hole 38, the side wall hole 38 is used for the three purposes. This simplifies the configuration of the electrode portion device 300 and requires a few side wall holes 38, thereby allowing the effective reduction in releasing of the volatile component of the water-containing material 6. For two or three side wall holes 38, the side wall holes 38 may share the three purposes. This facilitates operations for the three purposes.

The shape of the side wall hole 38 used for releasing the internal pressure is not particularly limited, but the side wall hole 38 for the other purposes is suitably a straight hole having a circular cross section and a constant diameter in order to facilitate operation.

The water-containing material 6 may be introduced into the water-containing material holders 11 with a dropper or a syringe, for example. Considering this, the side wall hole 38 which may be used for introducing the water-containing material 6 is suitably tilted downward from the outside of the container body 31 toward its inside, as illustrated in FIG. 11. This facilitates introduction of the water-containing material 6.

The diameter of the side wall hole 38, i.e., the maximum width in the cross section perpendicular to the center axis of the side wall hole 38 is preferably 1 mm or more to 7 mm or less, more preferably 2 mm or more to 5 mm or less. For a large amount of gases generated, the side wall hole 38 having a diameter less than the lower limit may cause insufficient release of the internal pressure of the container 30, or may cause difficulty in the use for the other purposes. The side wall hole 38 having a diameter more than the upper limit may excessively release a volatile component of the water-containing material 6 therethrough.

The side wall hole 38 can also be provided for the container 30 of the first embodiment. In this case, the side wall hole 38 is suitably provided in each of the two water-containing material holders 11.

[Hole]

A hole 36 for allowing a temperature sensor 37 to be inserted therein is preferably provided in the lower side wall of the container body 31.

The bottom 36A of the hole 36 is penetrating the container body 31 to the inside. This enables the distal end 37A of the temperature sensor 37 inserted into the hole 36 to enter the inside of the water-containing material holder 11 though the bottom 36A to be in contact with the water-containing material 6. Accordingly, the temperature sensor 37 can detect the temperature of the water-containing material 6.

The hole 36 is suitably formed such that its bottom 36A becomes close to the electrodeposition coating film 4 as much as possible when the container 30 is disposed on the surface of the electrodeposition coating film 4.

Specifically, for example, the hole 36 can be provided by embedding a tubular member made from an insulating material such as a resin with a high thermal conductivity and a ceramic, in the side wall of the container body 31 using insert molding when the container body 31 is formed. Alternatively, the hole 36 may be provided in the side wall of the container body 31 using a mold when the container body 31 is formed.

Note that the hole 36 may be provided so that the bottom 36A does not penetrate the container body 31 to the inside.

—Temperature Sensor—

The electrode portion device 300 preferably includes a temperature sensor 37 for detecting the temperature of the water-containing material 6. The temperature sensor 37 is inserted into the hole 36 to detect the temperature of the water-containing material 6.

In the corrosion resistance test according to the present embodiment, the temperature of the water-containing material 6, particularly a portion of the water-containing material 6 near the interface between the electrodeposition coating film 4 and the water-containing material 6 is important. The temperature sensor 37 inserted into the hole 36 can accurately detect the temperature of the portion of the water-containing material 6 near the interface, thereby improving the reliability of the corrosion resistance test.

Specific examples of the temperature sensor 37 include a thermocouple, a fiber optic thermometer, and an infrared thermometer. With being inserted into the hole 36, the temperature sensor 37 is preferably molded with a resin having a high thermal conductivity or another material in order to further accurately detect the temperature of the water-containing material 6.

An amount of the distal end 37A of the temperature sensor 37 entering the inside of the container body 31 is suitably as small as possible. This can substantially prevent the reduction in accuracy of the detection of the temperature due to adhering of the electrodeposition coating film 4 expanded in the current supply step S5 to be described later to the distal end of the temperature sensor 37.

The electrode portion device 300 of the first embodiment may include the hole 36 and the temperature sensor 37. In this case, the hole 36 and the temperature sensor 37 are suitably provided for each of the two water-containing material holders 11.

—Electrode—

In the second embodiment, a single electrode 12 is in contact with the water-containing material 6 contained in the single water-containing material holder 11.

<<External Circuit>>

In the second embodiment, the wiring 71 of the external circuit 7 electrically connects between the electrode 12 and the steel sheet 2.

—Current Supplier—

In the second embodiment, the current supplier 8 serves as a power supply that supplies a voltage/current between the electrode 12 and the steel sheet 2 in the current supply step S5. The current supplier 8 also serves as a current detector/voltage detector that detects a current/voltage flowing between them.

<<Control Device>>

The control device 9 is also electrically or wirelessly connected to the temperature sensor 37.

The temperature information detected with the temperature sensor 37 is transmitted to the control device 9 and is stored in the storage 92. The control unit 93 may be configured to control the temperature settings of the hot plate 41 based on the temperature information detected with the temperature sensor 37. This configuration allows the temperatures to be controlled further accurately.

<Corrosion Resistance Test Method>

<<Preparation Step>>

In the preparation step S1, prepared is a coated metal material 1 having at least one damaged portion 5 reaching a steel sheet 2 through an electrodeposition coating film 4 and a chemical conversion coating 3.

<<Connection Step>>

In the connection step S3, the electrode 12 connected to one end of the wiring 71 is disposed in the water-containing material holder 11 through the side wall hole 38. The wiring 71 has the other end connected to the steel sheet. Accordingly, the electrode 12 and the steel sheet 2 are being electrically connected to each other via the external circuit 7. Then, the temperature sensor 37 is disposed.

Then, the water-containing material 6 is placed at a predetermined amount in the water-containing material holder 11 through the side wall hole 38 with a dropper or any other tool. At this time, at least the distal end 12a of the electrode 12 is being sunk in the water-containing material 6. The water-containing material 6 contained in the water-containing material holder 11 comes into contact with the surface of the electrodeposition coating film 4, and enters the inside of the damaged portion 5.

<<Temperature Control Step>>

In the second embodiment, the temperature of the water-containing material 6 near the interface between the electrodeposition coating film 4 and the water-containing material 6 is measured using the temperature sensor 37 in place of a thermometer so as to confirm that the temperature is controlled to the predetermined temperature. Thus, the temperature of the water-containing material 6 near the interface can be measured over time and stored in the storage 92. This can improve the reliability of the corrosion resistance test.

<<Current Supply Step>

In the second embodiment, the current supply step S5 is a step of supplying, with the current supplier 8, a current between the electrode 12 and the steel sheet 2 serving as an anode and a cathode, respectively, as shown in the state of FIG. 12 for corrosion of the steel sheet 2 to progress around the damaged portion 5.

In response to the supply of a current between the electrode 12 serving as an anode and the steel sheet 2 serving as a cathode, the cathode reaction progresses in the exposing portion 5A of the steel sheet 2 at the damaged portion 5. Then, electrolysis of water also progresses to generate hydrogen, depending on the conditions of the current supply. Such progress of the cathode reaction and occurrence and progress of expansion of the electrodeposition coating film 4 around the damaged portion 5 are accelerated reproduction of actual corrosion of the coated metal material 1, similarly to that in the first embodiment. In this way, the progress degree of the corrosion of the coated metal material 1 can be evaluated by evaluation of the size of the expansion of the electrodeposition coating film 4 at the time when predetermined time has elapsed from the start of the current supply. Accordingly, the rate of increase in the size of expansion of the electrodeposition coating film 4 obtained as the progress degree of corrosion of the coated metal material 1 enables accurate evaluation of the corrosion resistance related to the corrosion progress rate of the coated metal material 1.

Third Embodiment

In the above embodiments, the following correction step S8 may be performed.

<<Correction Step>>

A variation in the size of the damaged portion 5 before the current supply step S5 causes a variation in the progress degree of the cathode reaction and electrolysis of water which progress at the damaged portion 5, the degree of closure of the damaged portion 5 due to expansion of the electrodeposition coating film 4, the degree of degassing of hydrogen generated in the expansion of the electrodeposition coating film 4, and other factors. This further causes a variation in the size of the expansion of the electrodeposition coating film 4, resulting in a reduction of the reliability of the corrosion resistance test. However, it is difficult to prepare coated metal materials 1 having damaged portions 5 with exactly the same size in order to reduce such variations.

In the correction step S8, the progress degree of corrosion calculated in the calculation step S7 is corrected based on the size of the damaged portion 5 before the current supply step S5. Specifically, for example, the correction step S8 is performed to correct the progress degree of the corrosion of the coated metal material 1 calculated in the calculation step S7, based on the size of the damaged portion 5 measured in the first measurement step S2 and a correlation between the size of the damaged portion 5 and the progress degree of the corrosion of the coated metal material 1. The correlation is determined on an exploratory basis in advance. In the correction step S8, the arithmetic unit 91 of the control device 9 functions as a corrector to correct the progress degree of the corrosion of the coated metal material 1. The storage 92 further stores information on the corrected progress degree of the corrosion of the coated metal material 1.

Specifically, the third embodiment will be described using the test example of FIG. 3 with reference to the case where the progress rate of the expansion of the electrodeposition coating film 4, i.e., the corrosion progress rate is employed as the progress degree of corrosion. FIG. 13 is a graph showing a relationship between the diameter of each of damaged portions 5 in MUTs F1 and F2 and an index of the corrosion progress rate in the corrosion resistance test of experimental examples to be described later. Note that the "index of the rate of corrosion progress" is a ratio of the corrosion progress rate with respect to the rate of corrosion progress in the case where the diameter of the damaged portion 5 is 1 mm.

As illustrated in FIG. 13, the corrosion progress rate increases with the decrease in the diameter of the damaged portion 5 in each of the MUTs F1 and F2 from 1.5 mm to 0.2 mm. In other words, the smaller the diameter of the damaged portion 5, the higher the corrosion progress rate becomes, and the larger the diameter of the damaged portion 5, the lower the corrosion progress rate becomes, i.e., the lower the accelerated reproducibility of corrosion becomes. With the increase in diameter of the damaged portion 5, the area of the exposing portion of the steel sheet 2 increases, and an electrochemical reaction (generation of hydrogen due to reduction of hydrogen ions) which is not involved directly in the expansion of the electrodeposition coating film 4 is promoted. This may increase the waste of electrical energy supplied with the current supplier 8.

A regression equation calculated from the results in the MUTs F1 and F2 is represented by a curve (R2=0.97) indicated by a solid line in FIG. 13. This regression equation is an example of the correlation mentioned above. As described above, the correlation between the size of the damaged portion 5 and the corrosion progress rate can be determined on an exploratory basis in advance using an experimental technique or analytical technique such as a simulation. As the correlation, information on the regression equation indicated by a solid line in FIG. 13 may be stored in the storage 92 and used for correction.

The correlation described above may be used as a correction factor corresponding to the size of the damaged portion 5. Specifically, for example, information on a correction factor corresponding to the predetermined size of the damaged portion 5, calculated from the regression equation such as shown in FIG. 13 may be stored in the storage 92 and used for correction. The correction factor is, for example, an index of the corrosion progress rate on the regression equation, corresponding to the predetermined diameter of the damaged portion 5 in the example of FIG. 13. Specifically, for example, in FIG. 13, the correction factor is 1 at 1 mm of the diameter of the damaged portion 5, and is 1.5 at 0.4 mm of the diameter of the damaged portion 5. Such a correction factor is calculated for the damaged portion 5 with a diameter in 0.1 mm increments and may be used for correction. The correction factor corresponding to the size of the damaged portion 5 calculated in advance as the correlation makes the correction easy. Accordingly, the corrosion resistance test with high reliability and versatility can be performed with a simple configuration.

For example, it is assumed that the diameter of the damaged portion 5 measured in the first measurement step S2 is 0.4 mm, the corrosion progress rate calculated in the calculation step S7 is 1.5 mm/h. Further, the correction factor is used as the correlation, and, for example, the correction factor is 1 at 1 mm of the diameter of the damaged portion 5, and is 1.5 at 0.4 mm of the diameter of the damaged portion 5. In this case, the arithmetic unit 91 corrects the corrosion progress rate of 1.5 mm/h to 1 mm/h by dividing 1.5 mm/h by 1.5 which is a correction factor, based on information on the diameter of the damaged portion 5 being 0.4 mm and information on the correction factor being 1.5 at 0.4 mm of the diameter of the damaged portion 5 read out from the storage 92.

The correction step S8 allows accurate evaluation of the progress degree of corrosion of the coated metal material 1 regardless of the size of the damaged portion 5 where the cathode reaction progresses, measured before the current supply. Accordingly, the reliability and versatility of the corrosion resistance test can be enhanced.

EXPERIMENTAL EXAMPLES

[Corrosion Resistance Test]

As shown in Table 3, two kinds of MUTs which differ from each other in paint of the electrodeposition coating film 4 and the electrodeposition baking condition were prepared as MUTs F1 and F2.

TABLE 3

|  | Material Under Test | |
| --- | --- | --- |
|  | F1 | F2 |
| Electrodeposition Baking Conditions | 160° C. × 10 min | 140° C. × 20 min |
| Diameter of Damaged Portion (mm) | 0.2 | 0.2 |
|  | — | 0.42 |
|  | 0.6 | 0.6 |
|  | — | 1 |
|  | 1.5 | 1.5 |
| Temperature (° C.) | 65 | 65 |
| Holding Time (min) | 30 | 30 |
| Time for Current Supply (hr) | 0.5 | 0.5 |

Each of the MUTs F1 and F2 uses a steel sheet 2 as a metal base, and a zinc phosphate coating (chemical conversion treatment time, 120 sec) as a chemical conversion coating, and an electrodeposition coating film 4 with a thickness of 10 μm. For MUTs, the corrosion resistance tests were performed in the manner shown in FIG. 12.

In each of the MUTs F1 and F2, two damaged portions 5 with the same diameter reaching the steel sheet 2 were formed at a distance of 4 cm from each other using a Vickers hardness tester. Specifically, as shown in Table 3, for MUT F1, three kinds of samples each having two damaged portions 5 with a diameter of 0.2 mm, 0.6 mm, or 1.5 mm were prepared. For MUT F2, five kinds of samples each having two damaged portions 5 with a diameter of 0.2 mm, 0.42 mm, 0.6 mm, 1 mm, or 1.5 mm were prepared.

The water-containing material 6 used was a mixture obtained by mixing 50 g of sodium chloride as an electrolyte material, 50 g of calcium chloride, 50 g of sodium sulfate, and 1000 g of kaolinite with respect to 1.2 L of water. The electrode 12 used was a ring-shaped perforated electrode (made from platinum) with an outer diameter of about 12 mm and an inner diameter of about 10 mm. A hot plate 41 was disposed below the steel sheet 2, and the steel sheet 2 and the water-containing material 6 were warmed to 65° C. The insulation between the steel sheet 2 and the hot plate 41 was secured by the same method as in the corrosion resistance test for MUT B in the first embodiment. A current value supplied with the current supplier 8 was 1 mA. The water-containing material 6 being placed on the surface of the electrodeposition coating film 4 was held for 30 min, and then a current was supplied. The time for the current supply was 0.5 hour. After the end of the current supply, the rate of corrosion progress and the index of the rate of corrosion progress illustrated in FIG. 13 were calculated for each of the MUTs by the method mentioned above.

Fourth Embodiment

In the embodiments described above, the measurement target portion 4A of the coated metal material 1 has a damaged portion 5 reaching the steel sheet 2 through the electrodeposition coating film 4 and the chemical conversion coating 3, but the damaged portion 5 does not have to reach the steel sheet 2. The measurement target portion 4A does not have to have a damaged portion 5.

In this case, in the first embodiment, for example, when the water-containing material 6 is permeated through the electrodeposition coating film 4 and then reaches the steel sheet 2, a cathode reaction (a cathode site in FIG. 3) or an anode reaction (an anode site in FIG. 3) progresses in a contact portion between the water-containing material 6 and the steel sheet 2 in the measurement target portion 4A shown in FIG. 3. Specifically, if the damaged portion 5 does not reach the steel sheet 2, or no damaged portion 5 is formed, the end of the corrosion resistance time is considered to be when the water-containing material 6 first reaches the steel sheet 2 after permeating through the electrodeposition coating film 4. Upon contact of the water-containing material 6 with the steel sheet 2, corrosion starts to occur. Then, the corrosion progresses from a portion where the corrosion first occurs, and the corrosion progress rate is calculated based on the size of the expansion of the electrodeposition coating film 4. The coated metal material 1 suitably has a damaged portion 5, particularly reaching the steel sheet 2, in order to accelerate corrosion from the desired position.

For the coated metal material 1 having no damaged portion 5, the first measurement step S2 is unnecessary. In this case, for example, the size of the expansion of the electrodeposition coating film 4 occurred in the current supply step S5 may be measured in the second measurement step S6, and the progress degree of corrosion may be calculated based on the size.

OTHER EMBODIMENTS

The case where two out of a plurality of damaged portions 5 present apart from each other in the coated metal material 1 were used was described in the first embodiment, and the case where single damaged portion 5 was present in the coated metal material 1, or one out of a plurality of damaged portions 5 present apart from each other in the coated metal material 1 was used was described in the second embodiment. Although not shown, three or more out of a plurality of damaged portions 5 present apart from each other in the coated metal material 1 may be used to perform a corrosion resistance test. Specifically, for example, first, three or more water-containing material holders 11 are arranged to contain respective three or more damaged portions 5. The water-containing material 6 is then introduced into the water-containing material holders 11, and three or more electrodes 12 are immersed therein. The electrodes 12 are thereafter connected in series, and are set to be a cathode, an anode, and a cathode . . . alternately. This enables a corrosion resistance test to be performed on a plurality of sites in parallel by a single current supply. This allows the corrosion resistance test to be performed in a shorter time with higher reliability.

The configuration of the device of the first embodiment may be partially adopted in the configuration of the device of the second embodiment, or the configuration of the device of the second embodiment may be partially adopted in the configuration of the device of the first embodiment. The corrosion resistance test of the first embodiment may be performed using two electrode portion devices 300 in the corrosion resistance test apparatus 100 of the second embodiment shown in FIGS. 10 and 11.

The embodiments described above each include a control device 9 connected electrically or wirelessly to various detectors and targets to be controlled, but the corrosion resistance test method according to the present disclosure may be performed with other units. For example, current supply information of the current supplier 8, temperature information of the temperature sensor 37, image data of the image detector, and other information may be read by the user into another computer to perform the process.

In the embodiments described above, for example, a single control device 9 functions as a calculator in the first measurement step S2, second measurement step S6, and calculation step S7, but, for example, different control devices may be used as units for the respective steps. A single control device 9 suitably functions to perform multiple roles in order to improve accuracy of the results of calculation with the control device 9 and contribute to the downsizing of the corrosion resistance test apparatus 100.

The present disclosure can provide a corrosion resistance test method that is for a coated metal material and capable of obtaining highly reliable evaluation results in a short time, and a water-containing material for use in the same, and is thus quite useful.

What is claimed is:

1. A corrosion resistance test method for a coated metal material that includes a metal base and a surface treatment film provided on the metal base, the method comprising the steps of:
   disposing one or more water-containing material holders each holding a water-containing material to be in contact with the surface treatment film and one or more electrodes to be in contact with the water-containing material contained in the one water-containing material holder or in each of the water-containing material holders, and electrically connecting, with an external circuit, between the one electrode and the metal base, or between the electrodes; and
   supplying a current between the one electrode and the metal base, or between at least one of the electrodes and at least one of the other electrodes, as an anode and a cathode, respectively from a current supplier provided on the external circuit to bring corrosion of the coated metal material to progress, wherein
   the water-containing material has a viscosity at 65° C. of 10 mPa·s or more to 40 mPa·s or less.

2. The method of claim 1, wherein
   the water-containing material has a viscosity at 65° C. of 20 mPa·s or more to 40 mPa·s or less.

3. The method of claim 2, wherein
   the water-containing material comprises water, an electrolyte material, and a thickener, and
   the content of the thickener in the water-containing material is 4.0 mass % or more to 15.5 mass % or less.

4. The method of claim 2, further comprising the step of:
   controlling a temperature of at least the coated metal material before the step to bring corrosion of the coated metal material to progress.

5. The method of claim 2, wherein
   the coated metal material has one or more damaged portions reaching the metal base through the surface treatment film, and
   the one or more water-containing material holders are disposed so as for the water-containing material to be in contact with the one damaged portion or the damaged portions.

6. A water-containing material for use in the method of claim 2 for a coated metal material.

7. The water-containing material of claim 6, comprising: water, an electrolyte material, and a thickener, and having a viscosity at 65° C. of 20 mPa·s or more to 40 mPa·s or less controlled using the thickener.

8. The method of claim 1, wherein
the water-containing material comprises water, an electrolyte material, and a thickener, and
the content of the thickener in the water-containing material is 4.0 mass % or more to 15.5 mass % or less.

9. The method of claim 8, further comprising the step of:
controlling a temperature of at least the coated metal material before the step to bring corrosion of the coated metal material to progress.

10. The method of claim 8, wherein
the coated metal material has one or more damaged portions reaching the metal base through the surface treatment film, and
the one or more water-containing material holders are disposed so as for the water-containing material to be in contact with the one damaged portion or the damaged portions.

11. The method of claim 1, further comprising the step of:
controlling a temperature of at least the coated metal material before the step to bring corrosion of the coated metal material to progress.

12. The method of claim 1, wherein
the coated metal material has one or more damaged portions reaching the metal base through the surface treatment film, and
the one or more water-containing material holders are disposed so as for the water-containing material to be in contact with the one damaged portion or the damaged portions.

13. The method of claim 12, wherein
in the step of supplying the current, progress of the corrosion of the coated metal material is indicated by expansion of the surface treatment film generated around the one or more damaged portions, and
the method further comprises the steps of: measuring a size of the one or more damaged portions before the step of supplying the current;
measuring a size of the expansion of the surface treatment film after the step of supplying the current; and
calculating a progress degree of the corrosion of the coated metal material, based on the size of the one or more damaged portions and the size of the expansion of the surface treatment film.

14. The method of claim 13, further comprising the step of:
correcting the calculated progress degree of the corrosion of the coated metal material, based on the size of the one or more damaged portions and a correlation between the size of the damaged portion and the progress degree of the corrosion of the coated metal material, the correlation being determined on an exploratory basis in advance.

15. A water-containing material for use in the method of claim 1 for a coated metal material.

16. The water-containing material of claim 15, comprising:
water, an electrolyte material, and a thickener, and
the content of the thickener in the water-containing material is 4.0 mass % or more to 15.5 mass % or less.

17. The water-containing material of claim 16, wherein
the water includes ion-exchanged water, and the electrolyte material includes at least one selected from the group consisting of sodium chloride, potassium chloride, magnesium sulfate, potassium nitrate, calcium phosphate, and potassium hydrogen tartrate.

18. The water-containing material of claim 16, wherein
the thickener is a polyether polyol-based urethane polymer.

19. The water-containing material of claim 15, comprising:
water, an electrolyte material, and a thickener,
and having a viscosity at 65° C. of 10 mPa·s or more to 40 mPa·s or less controlled using the thickener.

20. The method of claim 1, wherein
the water-containing material comprises water, an electrolyte material, and a thickener.

* * * * *